United States Patent
Carroll et al.

(10) Patent No.: US 8,242,759 B2
(45) Date of Patent: Aug. 14, 2012

(54) POWER SUPPLY CIRCUIT AND MULTI-PHASE CONTROL BASED ON PEAK AND AVERAGE CURRENT

(75) Inventors: Robert T. Carroll, Andover, MA (US); James Noon, Merrimack, NH (US); Venkat Sreenivas, Winchester, MA (US); Gary D. Martin, Boxford, MA (US)

(73) Assignee: International Rectifier Corporation, El Segundo, CA (US)

( * ) Notice: Subject to any disclaimer, the term of this patent is extended or adjusted under 35 U.S.C. 154(b) by 741 days.

(21) Appl. No.: 12/352,491

(22) Filed: Jan. 12, 2009

(65) Prior Publication Data

US 2009/0327786 A1  Dec. 31, 2009

Related U.S. Application Data

(60) Provisional application No. 61/076,052, filed on Jun. 26, 2008, provisional application No. 61/097,107, filed on Sep. 15, 2008.

(51) Int. Cl.
  *G05F 1/00* (2006.01)
(52) U.S. Cl. ......... 323/272; 323/283; 323/284
(58) Field of Classification Search ......... 323/272, 323/225, 271, 284, 283
  See application file for complete search history.

(56) References Cited

U.S. PATENT DOCUMENTS

| | | | |
|---|---|---|---|
| 6,465,993 B1 * | 10/2002 | Clarkin et al. | 323/272 |
| 7,002,325 B2 * | 2/2006 | Harris et al. | 323/272 |
| 7,151,362 B1 * | 12/2006 | Siri | 323/271 |
| 7,249,267 B2 * | 7/2007 | Chapuis | 713/300 |
| 7,315,150 B1 * | 1/2008 | Coleman | 323/222 |
| 7,317,305 B1 * | 1/2008 | Stratakos et al. | 323/282 |
| 7,342,386 B2 * | 3/2008 | Wildash | 323/272 |
| 7,358,711 B2 * | 4/2008 | Sutardja et al. | 323/283 |
| 7,456,618 B2 * | 11/2008 | Jain et al. | 323/272 |
| 7,492,134 B2 * | 2/2009 | Tang et al. | 323/241 |
| 7,710,084 B1 * | 5/2010 | Guo | 323/224 |
| 2002/0135338 A1 * | 9/2002 | Hobrecht et al. | 323/272 |
| 2004/0095103 A1 * | 5/2004 | Kernahan | 323/272 |
| 2009/0267578 A1 * | 10/2009 | Luo et al. | 323/272 |

OTHER PUBLICATIONS

Yang Zhang, Online Calibration of MOSFET ON-State Resitatnce for Precise Current Sensing, Sep. 2004, IEE Power Electronics Letters, vol. 2. No. 3, pp. 100-103.*

* cited by examiner

*Primary Examiner* — Gary L. Laxton
*Assistant Examiner* — Zekre Tsehaye
(74) *Attorney, Agent, or Firm* — Chapin IP Law, LLC

(57) ABSTRACT

According to one configuration, a multi-phase power supply adjusts a number of active phases based at least in part on a peak current supplied to a dynamic load. For example, a controller associated with the multi-phase power supply can monitor or receive a value indicative of a peak magnitude of current delivered by the multi-phase power supply to a dynamic load. The controller initiates comparison of the value to threshold information. Based at least in part on the comparison, the controller adjusts how many phases of the multi-phase power supply are activated to deliver the current delivered to the dynamic load. Thus, one embodiment herein is directed to controlling a multi-phase power supply based at least in part on a measured parameter such as peak current magnitude.

27 Claims, 16 Drawing Sheets

MULTI-PHASE SUPPLY WITH PHASE SHEDDING AND ADDING

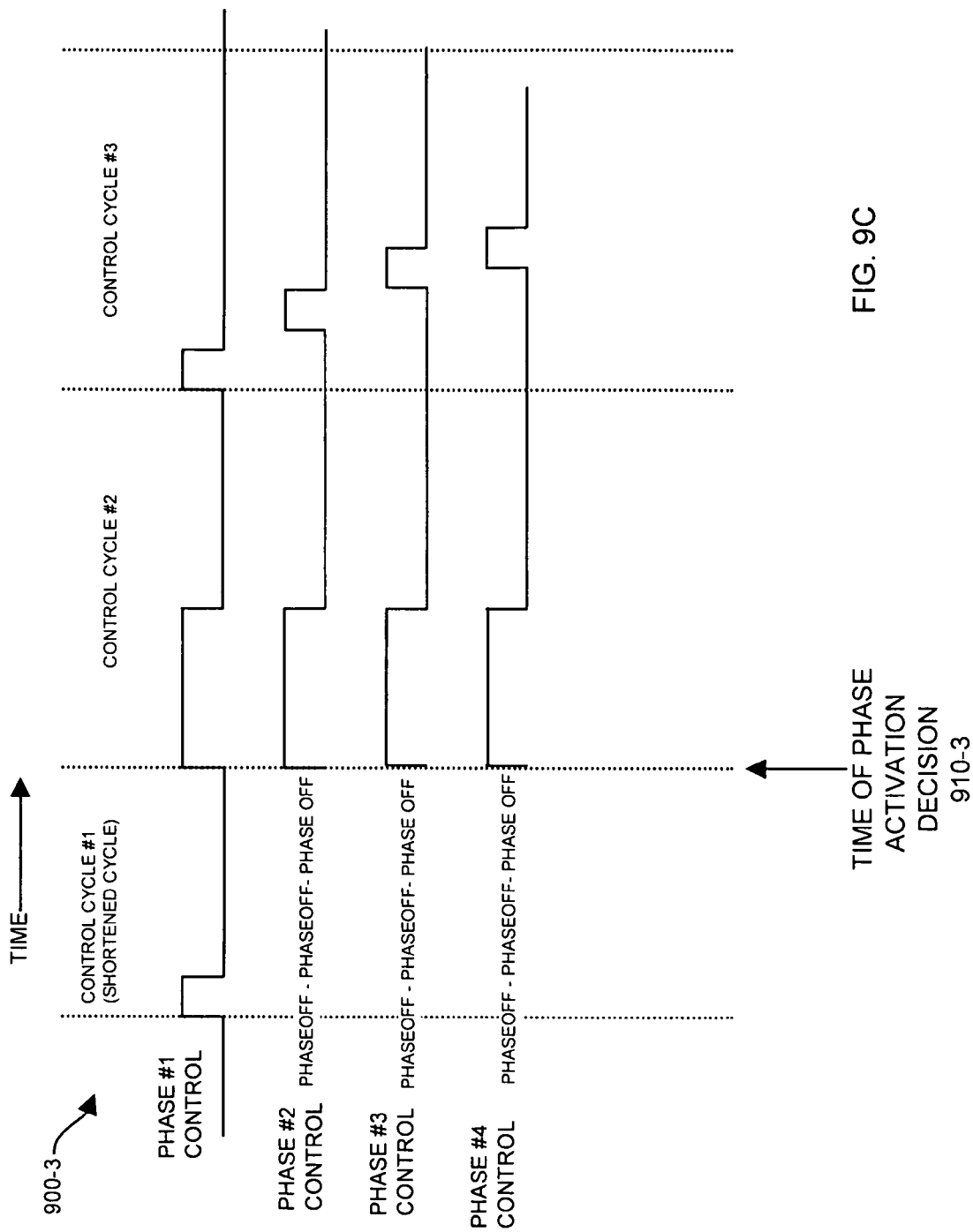

POWER SUPPLY CIRCUIT AND MULTI-PHASE CONTROL BASED ON PEAK AND AVERAGE CURRENT

RELATED APPLICATIONS

This application is related to and claims the benefit of earlier filed U.S. Provisional Patent Application Ser. No. 61/076,052 filed on Jun. 26, 2008, and entitled "ADAPTIVE EFFICIENCY CONTROL," the entire teachings of which are incorporated herein by this reference.

This application is related to and claims the benefit of earlier filed U.S. Provisional Patent Application Ser. No. 61/097,107 filed on Sep. 15, 2008, and entitled "Power Supply and Multi Phase Control," the entire teachings of which are incorporated herein by this reference.

This application is related to earlier filed U.S. patent application Ser. No. 11/969,655 filed on Jan. 4, 2008, and entitled "POWER SUPPLY AND CONTROLLER CIRCUITS", the entire teachings of which are incorporated herein by this reference.

This application is related to earlier filed U.S. patent application Ser. No. 11/969,659 filed on Jan. 4, 2008, and entitled "POWER SUPPLY AND CONTROLLER CIRCUITS," the entire teachings of which are incorporated herein by this reference.

This application is related to earlier filed U.S. patent application Ser. No. 11/969,662 filed on Jan. 4, 2008, and entitled "POWER SUPPLY AND CONTROLLER CIRCUITS," the entire teachings of which are incorporated herein by this reference.

BACKGROUND

It is known that a conventional voltage regulator can be used to regulate a DC voltage supplied to a load such as a microprocessor. For example, a voltage regulator can include a power converter, such as a DC-DC converter, and may include other components such as a controller for controlling operation of the power converter.

An example of a DC-DC converter is a synchronous buck converter, which has minimal components, and therefore is widely used in voltage regulator applications. In an example application, the input voltage to the buck converter is typically $12V_{DC}$. An output voltage produced by the voltage regulator may be $5.0V_{DC}$, $3.3V_{DC}$, or even lower.

Conventional multiphase interleaved voltage regulator power supply topologies can include two or more power converter phases that operate in parallel with each other to convert power and supply power to a corresponding load. Implementation of a multiphase voltage converter topology (as compared to a single voltage converter phase topology) can therefore enhance the output current capability of a power supply system.

A typical configuration of a voltage regulator such as a so-called synchronous buck converter includes an inductor, a high side switch, and a low side switch. During operation, a controller associated with the buck converter repeatedly pulses the high side switch ON to convey power from a power source through the inductor to a dynamic load. The controller repeatedly pulses the low side switch ON to provide a low impedance path from a node of the inductor to ground in order to control an output of the buck converter. Thus, the energy stored in the inductor increases during a time when the high side switch is ON and decreases during a time when the low side switch is ON. During switching operation, the inductor transfers energy from the input to the output of the converter phase.

Today's microprocessors and high performance ASIC chips can operate on low voltages and require a wide range of currents such as less than 1 A (Ampere) and over 100 amperes. A load can operate at these extremes of current for long periods of time. Under such extreme conditions, it is challenging to maintain an output voltage of a power converter within a tolerable range.

Many multi-phase power supplies in use today do not optimize the number of active phases to achieve the best efficiency across a range of load currents. Instead, for simplicity sake, designers often optimize at one point and accept less than optimum efficiency at all other points. The optimization point is frequently some intermediate current.

However, attempts have been made to increase the efficiency of voltage regulators that support such wide swings in output current. For example, it is known that certain buck converters are more efficient at a higher end of a respective operational range than at a lower end of the range. To increase the efficiency of a converter over a wide current range, controllers sometimes implement phase shedding techniques. That is, at lower current values in a range, fewer phases of a respective multi-phase power supply are activated. At higher current values within a range, more phases of a multi-phase power supply are activated to power a respective dynamic load.

More specifically, today's microprocessors and high performance ASIC chips can operate from low voltages and require high currents. In applications such as microprocessor and graphics processor power delivery, the load can range from low (1 A to 20 A) to high (>100 A). Often the processor will operate at an average current that is around 50-70% of maximum.

Due to the increasing cost of electricity and environmental harm caused by creating electricity, there is a need to have high DC-DC conversion efficiency optimized the range of load currents. In multiphase buck switching regulators supporting low-voltage high-current applications, the number of phases is chosen to optimize the efficiency at high load currents where the losses are the largest. This results in less than optimum efficiency at lighter loads where a large number of phases are not needed.

SUMMARY

Conventional voltage converter circuits such as those discussed above can suffer from additional deficiencies. For example, power supply circuits such as conventional synchronous buck converters and the like typically operate at a reduced efficiency. Such systems must ensure that an output voltage is controlled within a tolerable range, even when there is an abrupt change in current consumption requirements. The output voltage of the power supply most often must be kept within the tolerable range because over voltage and under voltage conditions are undesirable. As an example, occurrence of an under voltage condition can result in an abrupt and unexpected shut down of corresponding circuitry powered by the converter. Worse yet, occurrence of an over voltage condition can cause permanent damage to respective circuitry driven by the power supply.

Certain conventional power supply systems as mentioned above can use an average current sensing technique to determine if the number of phases should be changed. This conventional technique can misinterpret a load oscillation to be a steady state load current condition, resulting in stress to power components. For example, if the load is oscillating between 30 A and 130 A, an average current sensing approach will measure the current as being 80 A. In response to such a measurement, a corresponding power supply may reduce the number of active phases. During the time when the current is around 130 A, the power inductor in each phase can saturate, causing very high current spikes that can damage the internal switching components such as high side switch circuitry and low side switch circuitry.

Unfortunately, inefficiencies in a power supply can require that the power supply be oversized to account for excess internal losses. Operating a power supply at a lower efficiency can substantially increase operational costs because energy is becoming increasingly expensive. Component stress in a power supply may lead to premature failure of the power supply. Failure of a power supply may cause damage to the circuitry being powered.

Techniques discussed herein deviate with respect to conventional applications such as those discussed above. For example, certain embodiments herein are directed to improving the robustness and efficiency of switching power supply circuits.

According to one configuration, a multi-phase power supply adjusts a number of active phases based at least in part on a peak current supplied to a dynamic load. For example, a controller associated with the multi-phase power supply can monitor or receive a value indicative of a peak magnitude of current delivered by the multi-phase power supply to a dynamic load. The controller initiates comparison of the value to threshold information. Based at least in part on the comparison, the controller adjusts how many phases of the multi-phase power supply are activated to deliver the current delivered to the dynamic load. Thus, one embodiment herein is directed to controlling a multi-phase power supply based at least in part on a measured parameter such as peak current magnitude.

In accordance with further embodiments, the controller can be configured to maintain multiple threshold values defining multiple operational ranges of the multi-phase power supply. For each of the multiple operational ranges, the controller maintains control information indicating a corresponding number of phases of the multi-phase power supply to activate to supply current to the dynamic load. In one embodiment, the control information such as the peak threshold value and/or filtered current threshold value can be user programmable.

During operation, the controller initiates sampling a parameter of the power supply such as an output current used to drive the dynamic load. A magnitude of the output current varies depending on a state of the dynamic load. Based on sample data derived from sampling the output current, the controller produces a peak current metric or value indicative of a peak current delivered to the dynamic load during a window of time. In one embodiment, the controller includes a sample circuit configured to sample the output current and a peak detector to produce a peak current value. The controller can also include a circuit such as a low pass filter configured to produce a filtered current value indicative of an average current supplied to the dynamic load.

In an example embodiment, the controller repeatedly analyzes current operating conditions of the multi-phase power supply to determine in which range to operate the multi-phase power supply and how many phases to activate for driving the dynamic load. For example, in each of multiple compare cycles, the controller initiates comparison of the peak current value and/or the filtered current value to respective threshold values defining the multiple operational ranges. Based on results of the comparison, the controller selects a range of the multiple operational ranges in which to control operation of the multi-phase power supply. In accordance with a selected range, the controller adjusts a number of active phases of the power supply used to produce the current supplied to the dynamic load. As a more specific example, responsive to detecting that the peak current associated with the output current is less than a peak current threshold value and that the filtered current value of the sampled output current is less than a current threshold value, the controller reduces a number of phases of the power supply that are activated to produce the current delivered to the dynamic load. On the other hand, responsive to detecting that the second value is greater than the second threshold value, the controller increases a number of phases of the power supply that are activated to produce the current delivered to the dynamic load.

As mentioned above, over a course of the multiple compare cycles, the output current of the multi-phase power supply can change. To operate the multi-phase power supply more efficiently for given load conditions, the controller either increases or decreases an active number of phases in the multi-phase power supply to produce the output current for driving the dynamic load.

In yet further embodiments, note that in addition to the control loop as discussed above, the controller can simultaneously implement another control loop to maintain the output voltage of the power supply within regulation. For example, a controller in the multi-phase power supply can be configured to sample an error voltage associated with the power supply. The error voltage is representative of a voltage difference between a reference voltage and an output voltage of the power supply that is used supply the current delivered to the dynamic load. A large error voltage typically means that the output voltage of the power supply is becoming dangerously close to an out of range condition.

During operation, the controller compares the error voltage to an error voltage threshold value. In response to detecting a condition such as that the error voltage is above the error voltage threshold value (e.g., error voltage limit), the controller increases how many phases of the power supply are activated to produce the current delivered to the dynamic load. Accordingly, before the power supply goes out of regulation (e.g., the output voltage is a drifts outside of the acceptable range), the controller immediately activates one or more additional phases.

The above described and embodiments as further discussed below ensure that a multi-phase power supply will not drop phases in the presence of fast load oscillations at low average current. For example, even though fewer than a currently activated number of phases in a multi-phase power supply can supply the needed average current, the fewer phases may not be able to handle the peak current or oscillations. Activating too few phases can lead to poor efficiency. As mentioned above, saturation of inductors in each of the phases can result in component failures.

Implementing the embodiments as described herein in a multi-phase power supply can help ensure that: 1) the dropping and adding of phases results in minimal disruption of the output voltage, and 2) the dropping and adding of phases does not significantly impact the stability of the control loop.

Although the teachings herein are well suited for use in switching power supply circuitry, it should be noted that embodiments herein are not limited to use in such applications and that the techniques discussed herein are well suited for other applications as well.

Note also that each of the different features, techniques, configurations, etc. discussed herein can be executed independently or in combination with any or all other features also described herein. Accordingly, the present invention can be embodied, viewed, and claimed in many different ways.

This summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives or permutations of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

FIGS. 9A, 9B, and 9C are an example diagrams illustrating phase activation control timing according to different embodiments herein.

DETAILED DESCRIPTION

Figure 1:
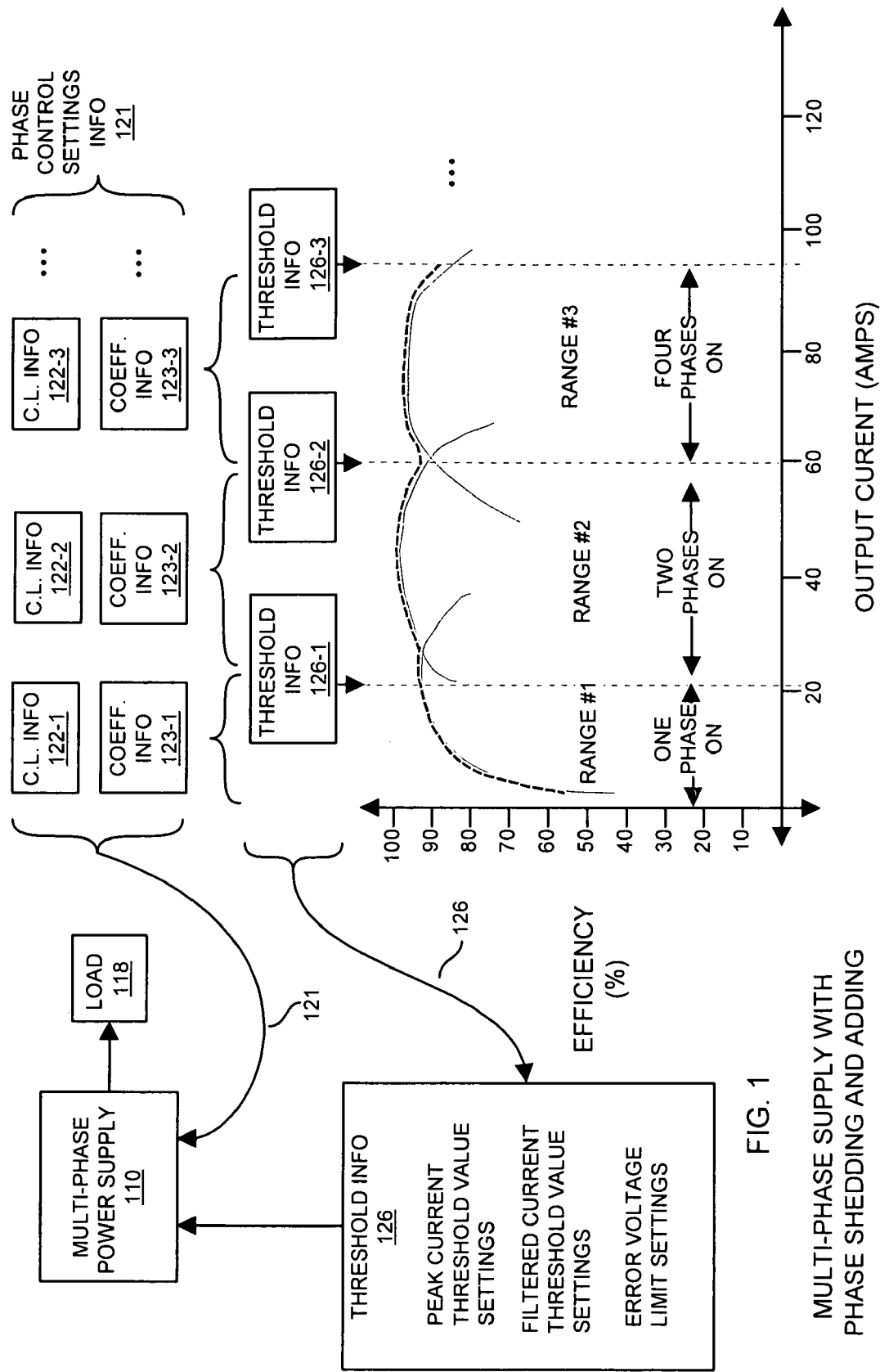
FIG. 1 is an example diagram of range information according to embodiments herein.

FIG. 1 is a example diagram of a multi-phase power supply 110 according to embodiments herein. As shown, the multi-phase power supply 110 utilizes threshold information 126 to identify in which range to operate its respective phases. Additionally, the multi-phase power supply 110 utilizes the control settings information 121 to identify parameters for controlling the different number of phases for each range.

As shown, threshold information 126 includes threshold information 126-1 and threshold information 126-2. In general, the threshold information 126 defines boundaries between respective operational ranges of the multi-phase power supply 110.

For example, in one embodiment, threshold information 126-1 defines boundary conditions between range #1 and range #2, threshold information 126-2 defines boundary conditions between range #2 and range #3, and so on.

During operation, the multi-phase power supply 110 monitors one or more parameters to determine how many phases to activate to supply power to dynamic load 118. For example, the multi-phase power supply 110 can be configured to monitor parameters such as a peak current delivered to the dynamic load 118, average current delivered to the load, etc.

Threshold information 126 can be configured to specify peak current threshold value settings, filtered current threshold value settings, error voltage limit settings, etc. In general, the multi-phase power supply 110 compares the one or more parameters with the threshold information 126 to identify in which of the multiple ranges to operate.

As a general example (and as more particularly shown in FIGS. 2-5), when one or more monitored parameters of the multi-phase power supply 110 indicate that the multi-phase power supply 110 has a peak current value and filtered current value that respectively fall below a peak current threshold value and filtered current threshold value as specified by threshold information 126-1, the multi-phase power supply 110 operates in range #1 and drives respective dynamic load 118 using a single phase such as phase 1. When operating in range #1, the multi-phase power supply 110 utilizes control settings information 121 such as current limit information 122-1 and coefficient information 123-1 as control settings to operate the single phase.

Note that the control settings for a particular phase can change depending on how many phases of multi-phase power supply 110 are simultaneously activated. For example, the control settings for operating phase 1 can change depending on whether phase 1 is the only activated phases, whether phase 1 is activated along with one other phase, whether phase 1 is activated along with two other phases, etc. Typically, the multi-phase power supply activates the appropriate number of phases as indicated in the in the illustrated graph to maintain the output voltage of the within an acceptable range for driving dynamic load 118.

The multi-phase power supply 110 can operate with fewer or additional phases depending on the dynamic load 118. For example, when one or more monitored parameters of the multi-phase power supply 110 indicate that the multi-phase power supply 110 has i) a peak current value and filtered current value that respectively fall below a peak current threshold value and filtered current threshold value as specified by threshold information 126-2, and ii) in which the peak current value and filtered current value do not respectively fall below a peak current threshold value and filtered current threshold value as specified by threshold information 126-1, the multi-phase power supply 110 operates in range #2 and drives respective dynamic load 118 using two phase (phase 1 and phase 2). When operating in range #2, the multi-phase power supply 110 utilizes current limit information 122-2 and coefficient information 123-2 as control settings to operate the two phases.

Thus, embodiments herein include adjusting a loop transfer function of the power supply depending on how many phases authorization resource active. The prior art does not adjust the loop transfer function to provide constant phase margin as the number of active phases are dropped. Without adjusting the lop transfer function, the control loop has the potential to become unstable.

The phase control algorithm as described herein therefore can ensure that the converter remains stable by automatically changing over to a new set of feedback loop control coefficients. These coefficients can be stored in a look up table or scaled by the number of active phases from a baseline set of coefficients designed for a single phase.

When one or more monitored parameters of the multi-phase power supply 110 indicate that the multi-phase power supply 110 has i) a peak current value and filtered current value that respectively fall below a peak current threshold value and filtered current threshold value as specified by threshold information 126-3, and ii) in which the peak current value and filtered current value do not respectively fall below a peak current threshold value and filtered current threshold value as specified by threshold information 126-2, the multi-phase power supply 110 operates in range #3 and drives respective dynamic load 118 using four phases (phase 1, phase 2, phase 3, and phase 4). When operating in range #3, the multi-phase power supply 110 utilizes current limit information 122-3 and coefficient information 123-2 as control settings to operate the two phases.

Note that control of four phases is shown by way of a non-limiting example only and that the multi-phase power supply 110 can include any number of phases for driving dynamic load 118. In one embodiment, by using peak current detection as described herein, the controller of multi-phase power supply 110 ensures that there is no large load oscillation present when the phase number is reduced. The controller can have multiple groupings of threshold information 126 such as up to one less than the number of phases.

Thus, in accordance with FIG. 1 and as specified by the respective threshold information 126, between around 0 and 20 amperes, the multi-phase power supply 110 activates a single phase such as phase #1; between around 20 and 60 amperes, the multi-phase power supply 110 activates two phases such as phase #1 and phase #2; between around 60 and 100 amperes, the multi-phase power supply 110 activates four phases such as phase #1, phase #2, phase #3, and phase #4; and so on. Thus, operation of the multi-phase power supply 110 from one range to a next range can include adjusting a number of activated phases in the power supply by one or more phases.

As mentioned above, after detecting in which range the multi-phase power supply 110 will operate, the multi-phase power supply 110 initiates operation of the respective phases depending on control settings information 121 for a given range.

Current consumption by the dynamic load 118 can change quickly. In such conditions, the multi-phase power supply 110 may skip ranges and operate any number of phases. For example, the multi-phase power supply 110 may be operating in range #3 with four activated phases. In response to detecting an appropriate reduction in current, the multi-phase power supply can initiate phase shedding to operate in range #1. In other words, in this example, the multi-phase power supply 110 can shed three phases in a single step rather than shed two phases in one step and one phase in a subsequent step. Thus, embodiments herein allow for an arbitrary number of phases to become inactive or active in a single phase shedding or phase adding transition.

In one embodiment, the multi-phase power supply 110 implements hysteresis to prevent unnecessary switching between ranges when the peak current and/or filtered current associated with the multi-phase power supply 110 vacillates around a particular set of threshold information 126.

Also, as discussed, in more detail later in this specification, the threshold information 126 can be programmable (by a user or other source) to enable control of the power supply via custom settings, the custom settings defining different operating ranges of the power supply and corresponding numbers of phases to be activated in the different operating ranges. Phase control settings 121 also can be programmable.

Figure 2:
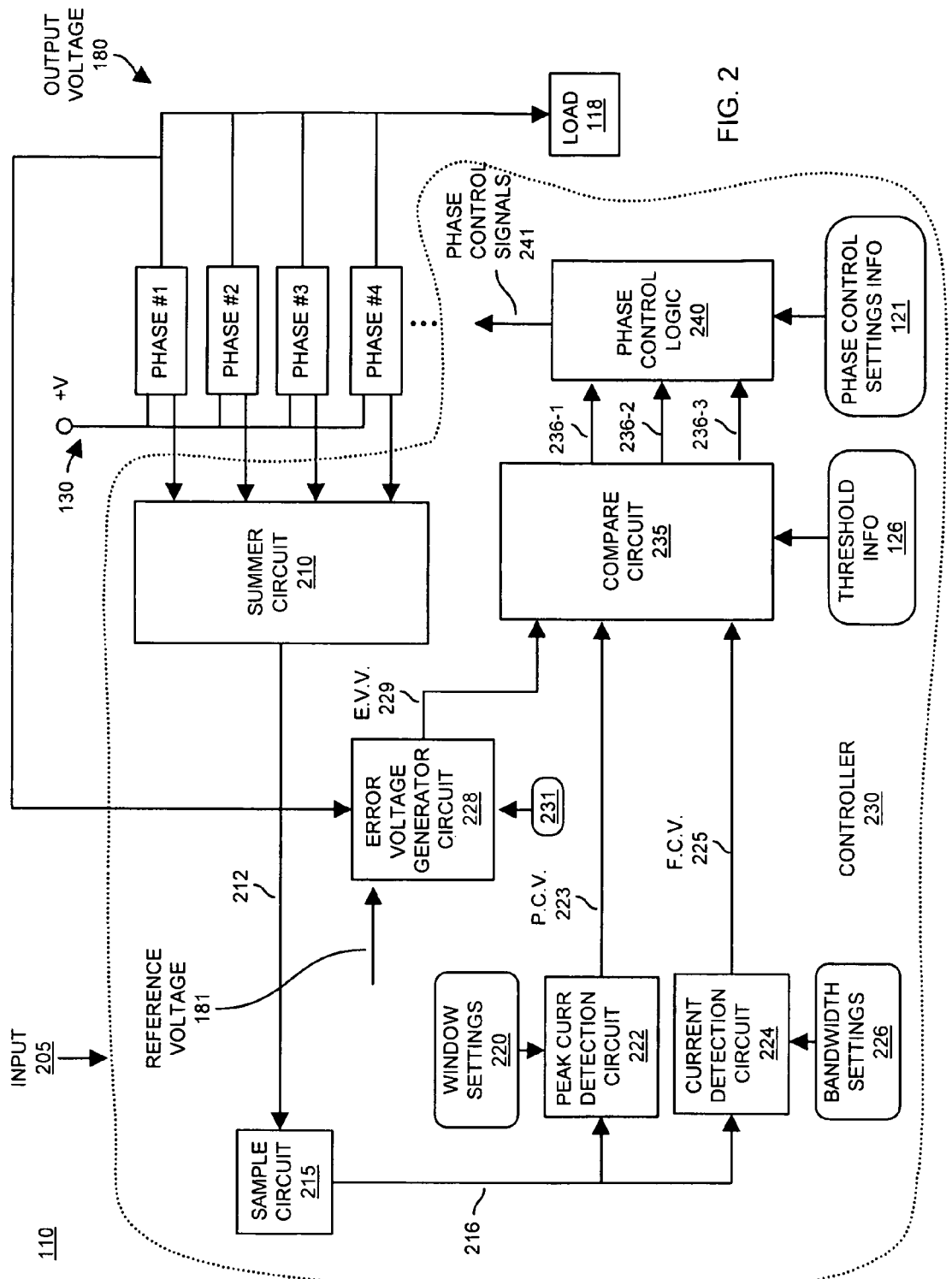
FIG. 2 is an example diagram illustrating a multi-phase power supply according to embodiments herein.

FIG. 2 is an example diagram illustrating elements of a respective multi-phase power supply 110 according to embodiments herein. As shown, multi-phase power supply 110 includes multiple phases such as phase 1, phase 2, phase 3, phase 4, etc.

The multi-phase power supply 110 also includes a controller 230. The controller can be or include a programmable integrated circuit in which a user or other source provides input 205 to define settings information such as window settings 220, bandwidth settings 226, threshold information 126, phase control settings information 121, etc. Accordingly, the multi-phase power supply 110 can be customized depending on the application.

In one embodiment, all or part of the controller 230 and related circuit can be a state machine including storage such as a non-volatile memory (e.g., flash ROM) to store configuration parameters. In such an embodiment, no processor or micro-controller is needed to carry out operations. Instead, the controller 230 can be implemented as a collection of logic gates, registers, and other electronic circuitry. The registers can be loaded with configuration parameters (numbers) such as thresholds, filter selection, etc., to carry out the operations as described herein. In another embodiment, as further described below, the controller 230 need not be a programmable computing device that executes instructions to carry out the operations as described herein.

During operation, one or more activated phases supply current to power dynamic load 118. In one embodiment, the phases are synchronous buck converters, although any type of suitable converter can be used.

Each phase provides feedback indicating how much current the respective phase delivers to the dynamic load 118. The summer circuit 210 receives the current consumption feedback from the phases and produces a current signal 212 representing a total current supplied by the phases to the dynamic load 118.

As its name suggests, the sample circuit samples the current signal 212 to produce sampled current signal 216. Both peak current detection circuit 222 and current detection circuit 224 receive the sampled current signal produced by sample circuit 215.

In one embodiment, the current detection circuit 224 filters the sampled current signal 216 to keep track of an average amount of current delivered to dynamic load 118. Filtering of the sampled current signal 216 can be more gate efficient (e.g., require less sophisticated electronic circuitry) than averaging because digital filtering does not require saving many samples in a deep register to produce an average current value. More specifically, the current detection circuit 224 can be implemented as a digital filter in which current measurement samples are continually added and results are continually calculated to produce an average current value. Although it is possible to use a block averaging approach in which a block of samples is saved in a deep register (or other storage) and then divided by the number of samples, such an embodiment may not be desirable as the sample data can miss events and the data may not be as fresh as with a digital filter.

During operation, the peak current detection circuit 222 monitors the sampled current signal 216 to produce peak current value 223. As its name suggests, window setting 220 specifies a window of time in which to produce the peak current value 223. For example, according to one embodiment, if the peak window setting 220 is set to a 1 millisecond time duration, the peak current detection circuit 222 maintains a highest detected value of the sampled current signal 216 for the latest or most recent 1 millisecond of sampling.

In one embodiment, the peak current detection circuit 222 includes a register and counter. For each new value of sampled current signal 216, the peak current detection circuit 222 compares the new sampled value to a value currently stored in the register. If the new sampled value is larger than the value stored in the register, the peak current detection circuit 222 stores the new value in the register (over the old value) and resets the counter. The counter is configured to count down over time. However, as mentioned above, each time a new sample value is stored in the register, the counter is reset to a maximum duration as indicated by the window setting 220. The peak current detection circuit 222 continues to count down if no new sample value is stored in the register. If the counter reaches zero, the peak current detection circuit 222 stores the most recent sampled current value into the register and resets the counter.

In one embodiment, the multi-phase power supply 110 enables programming of the time window settings 220 to enable control with custom settings. As mentioned above, the peak current detection circuit 222 generates the peak current value 223 based on repeated sampling of the output current delivered to the dynamic load 118 during the time window such that the peak current value 223 represents the peak magnitude of current delivered to the dynamic load 118 during the time window.

Current detection circuit 224 monitors sampled current signal 216 and produces a respective filtered current value 225 representing approximately the average current supplied by the active phases to the dynamic load 118. In one embodiment, the current detection circuit 224 is a low pass filter circuit.

Bandwidth setting 226 can be configured to specify the bandwidth for operating the low pass filter circuit. For example, according to one embodiment, the multi-phase power supply 110 enables programming of bandwidth settings 226 associated with the low-pass filter in the current detection circuit 224 to enable control with custom settings. When so configured, the current detection circuit 224 generates the filtered current value 225 based on repeated sampling of a metric representing the magnitude of current delivered to the dynamic load 118. The filtered current value 225 thus can represent the average magnitude of current delivered to the dynamic load 118.

Error voltage generator circuit 228 monitors output voltage 180 produced by multi-phase power supply 110. For example, in one embodiment, the error voltage generator circuit 228 compares the output voltage 180 to a reference voltage 181 to produce error voltage value 229. In one embodiment, the error voltage value 229 is a digital representation of the error voltage. Larger magnitudes of the error voltage value 229 may indicate that the output voltage 180 is drifting outside of a preferred voltage range.

In one embodiment, the error voltage generator circuit 228 includes a sample circuit and a low pass filter circuit configured in accordance with bandwidth settings 231. The sample circuit 215 samples the error voltage. Use of the low pass filter eliminates occurrence of voltage spikes in error voltage value 229 produced by error voltage generator circuit 228.

Compare circuit 235 receives error voltage value 229, peak current value 223, and filtered current value 225. Based on a comparison of the error voltage value 229, peak current value 223, and filtered current value 225 to threshold information 126, the compare circuit 235 produces signals 263-1, 236-2 and 236-3. Generation of signals 263 is more particularly discussed with respect to FIG. 4.

Referring again to FIG. 2, the phase control logic 240 receives signals 236. Based on signals 236, the phase control circuit identifies in which range to operate the multi-phase power supply 110. As mentioned above, depending on the range, the phase control logic 240 then generates to control signals 241 to control operation of the phases.

Figure 3:
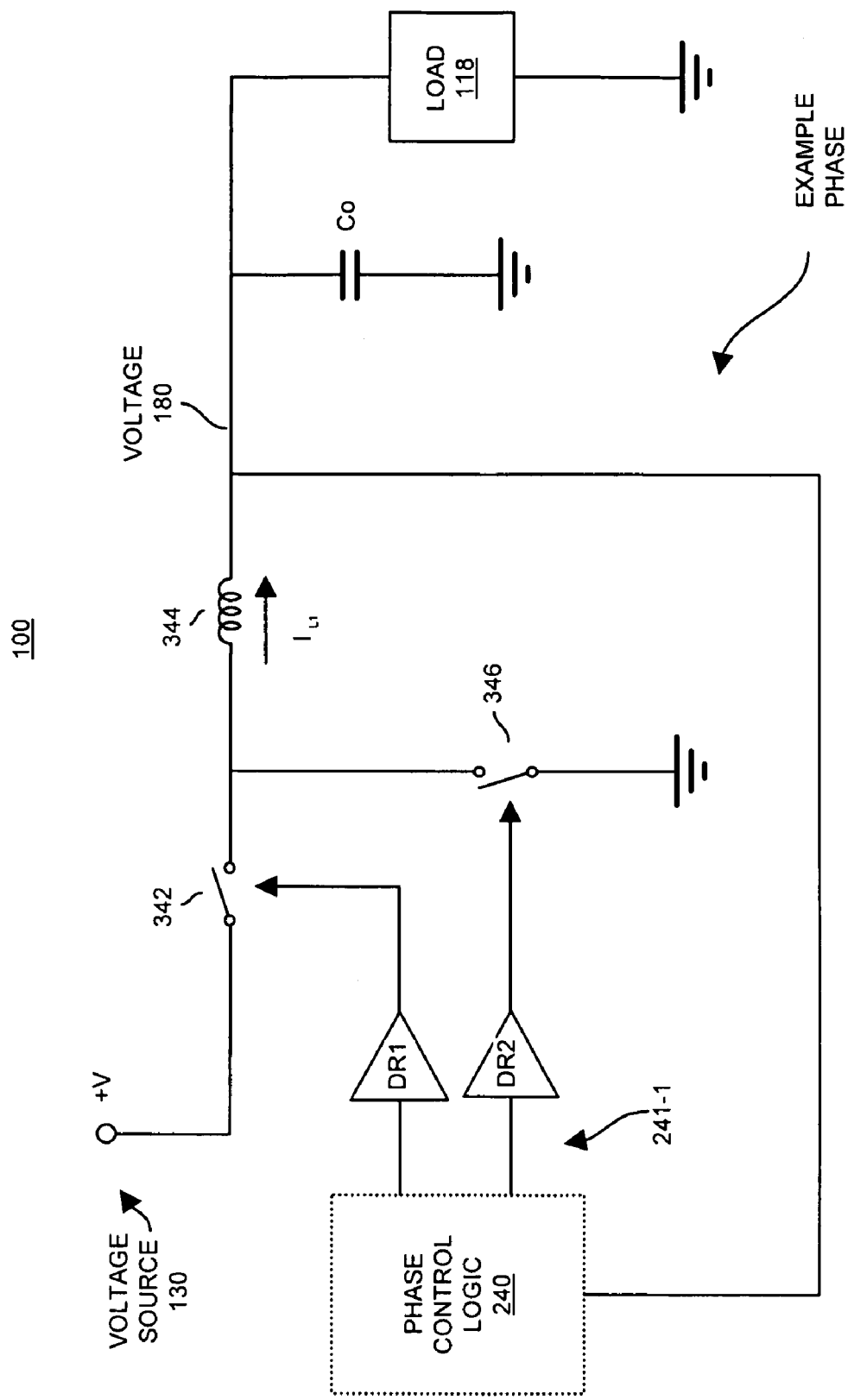
FIG. 3 is an example diagram of a phase according to embodiments herein.

FIG. 3 is a diagram illustrating of an example phase according to embodiments herein. As shown, phase control logic 240 generates control signals 241-1 to control respective high side switch circuitry 342 and low side switch circuitry 346. When high side switch circuitry 342 is turned ON (while low side switch circuitry is OFF), the current through inductor 344 increases. When low side switch circuitry 346 is turned ON (while high side switch circuitry is OFF), the current through inductor 344 decreases. To deactivate a phase, the phase control logic 240 sets both high side switch circuitry 344 and low side switch circuitry 346 to an OFF state.

Figure 4:
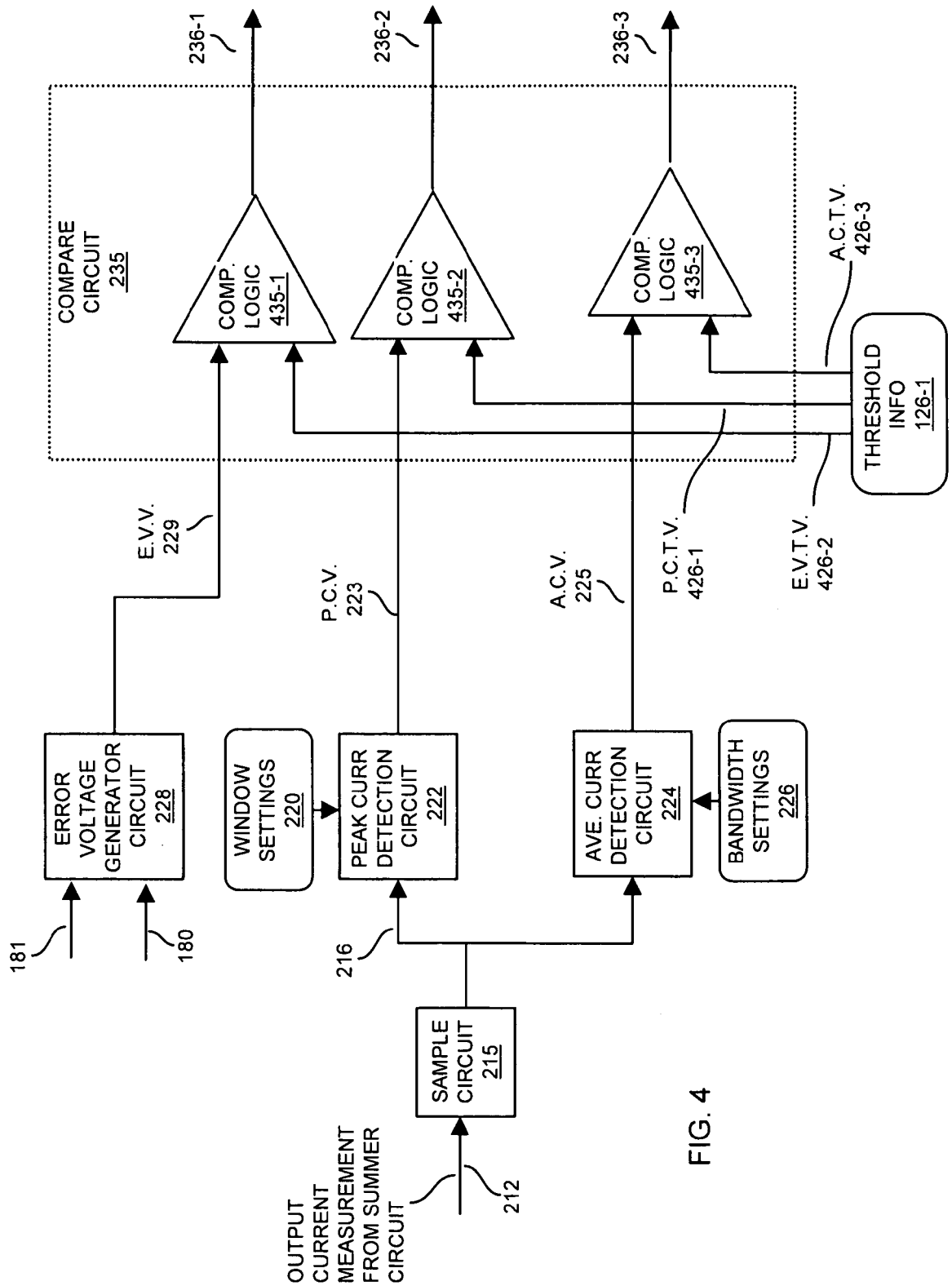
FIG. 4 is an example diagram of a controller according to embodiments herein.

FIG. 4 is an example diagram illustrating more particular details of the compare circuit 235 and related circuitry according to embodiments herein.

As previously discussed, error voltage generator circuit 228 produces error voltage value 229. Compare logic 435-1 compares error voltage value 229 with error voltage threshold value 426-2. Based on the comparison, the compare logic 435-1 produces signal 236-1 indicating whether the error voltage value 229 is above or below error voltage threshold value 426-2.

According to one embodiment, the multi-phase power supply 110 enables programming of the error voltage threshold value 426-1 by a user or other source. Accordingly, based on input, the multi-phase power supply 110 can operate based on custom settings.

As mentioned above, peak current detection circuit 222 produces peak current value 223 indicative of a peak detected output current associated with multi-phase power supply 110. During operation, compare logic 435-2 compares peak current value 223 with peak current threshold value 426-1. Based on the comparison, the compare logic 435-2 produces signal 236-2 indicating whether the peak current value 223 is above or below the peak current threshold value 426-1.

Current detection circuit 224 produces filtered current value 225 indicative of an average detected output current associated with multi-phase power supply 110. During operation, compare logic 435-3 compares filtered current value 225 with filtered current threshold value 426-3. Based on the comparison, the compare logic 435-3 produces signal 236-3 indicating whether the filtered current value 225 is above or below the filtered current threshold value 426-3.

Note that the previous example performs a comparison of the error voltage value 229, peak current value 223, and the filtered current value 225 to threshold information 126-1. This functionality can be duplicated so that the compare circuit 235 also compares the peak current value 223, and the filtered current value 225 to different threshold information 126 for detecting which range to operate the phases. A different error voltage threshold value 426-2 can be used as a limit value depending on which range the multi-phase power supply 110 currently operates or the same error voltage threshold value can be used for each of the ranges.

Figure 5:
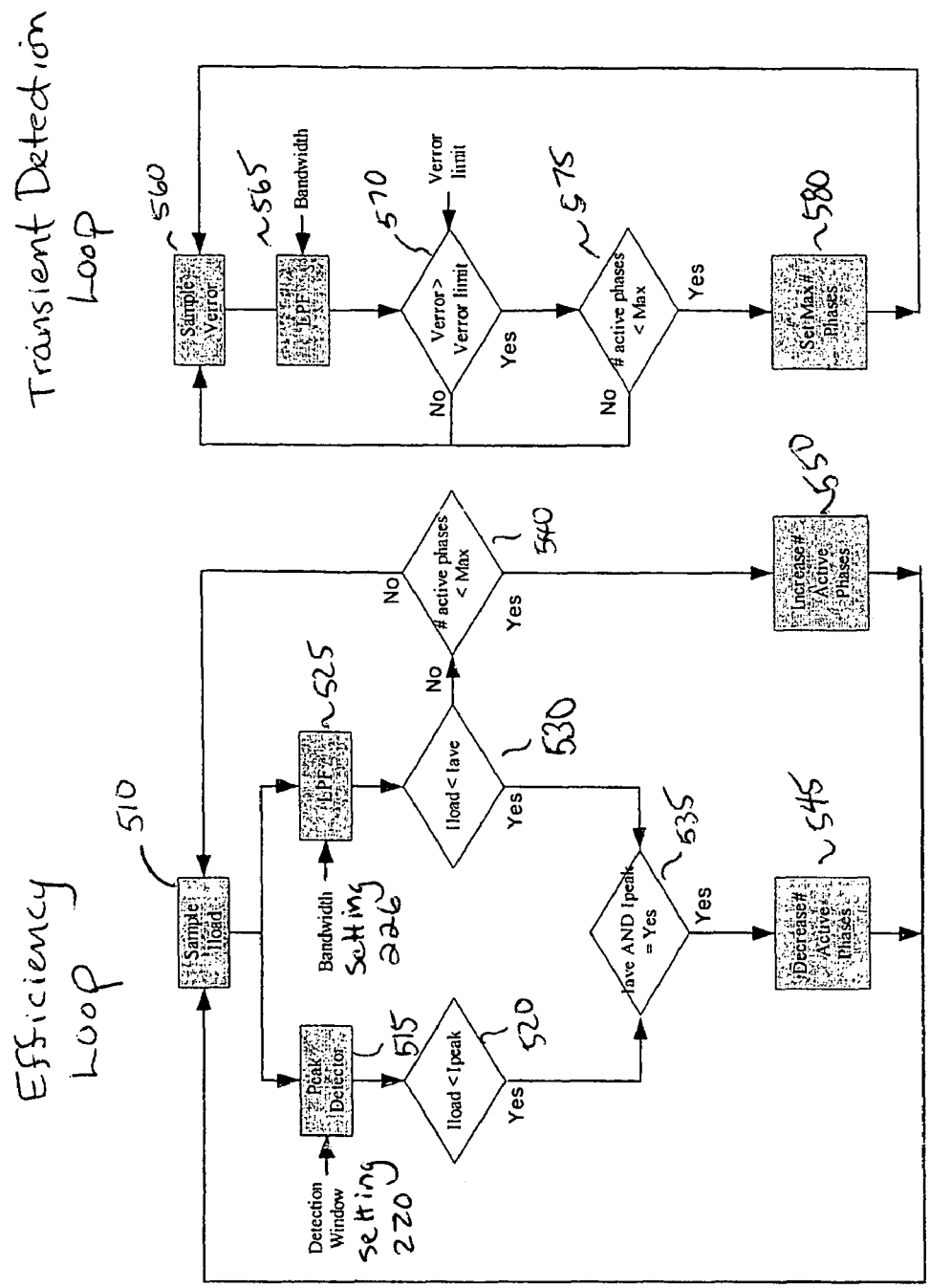
FIG. 5 is an example flow diagram of a control algorithm according to embodiments herein.

FIG. 5 is an diagram illustrating an example efficiency control loop and example transient detection control loop according to embodiments herein.

The efficiency loop includes steps 510 through 550 and ensures that the multi-phase power supply 110 operates with an appropriate number of active phases to supply power to dynamic load 118. More specifically, the efficiency loops ensures that the multi-phase power supply circuit 110 activates a reasonably few number of phases so that the multiphase power supply 110 is efficient but not to few phases in which occurrence of a normal transient condition overstresses components in the active phases. As described herein, activating an appropriate number of phases based on the peak current detected prevents overstressing the components in the active phases.

In step 510, the sample circuit 215 samples a power supply parameter such as an output current signal indicating of a magnitude of current supplied to the dynamic load 118.

In step 515, based on sample data derived from the sampling, the peak current detection circuit 222 produces a peak current value 223 indicative of a peak current delivered by the multi-phase power supply 110 to the dynamic load 110 during a window of time as specified by the window setting 220.

In step 525, based on sample data derived from the sample circuit 215, the current detection circuit 224 produces filtered current value 225 indicative of an average magnitude of current supplied by the power supply to the dynamic load 118.

In step 520, the compare logic 435-2 compares the peak current value 223 to the peak current threshold value 426-1.

In step 530, the compare logic 435-3 compares the filtered current value 225 with the filtered current threshold value 426-3.

In steps 545 and 550, based at least in part on the comparisons, the phase control logic 240 adjusts how many phases of a power supply are activated to produce the current delivered to the dynamic load.

For example, in step 535, responsive to detecting that the peak current value 223 (for a moving peak detection time window) is less than the peak current threshold value 426-1 and that the filtered current value 225 is less than the filtered current threshold value 426-3, the phase control logic 240 reduces a number of phases of the power supply that are activated to produce the current delivered to the dynamic load 118 in step 545.

In step 540, responsive to detecting that the filtered current value 225 is greater than the filtered current threshold value 426-3, the phase control logic 240 increases a number of phases of the power supply that are activated to produce the current delivered to the dynamic load 118 in step 550.

In general, the transient detection loop including steps 560 through 580 ensures that the multi-phase power supply 110 delivers the appropriate amount of current to the dynamic load 118 even during extreme transient conditions. In other words, if transient condition is detected in which the error voltage is large, the phase control logic 240 initiates activation of additional phases to account for the transient condition.

For example, in step 560, the error voltage generator circuit 228 samples an error voltage associated with the power supply. As previously discussed, the error voltage represents a voltage difference between a reference voltage and the output voltage 180. In step 565, the error voltage generator circuit filters the sampled error signal with a respective low pass filter circuit.

In steps 570 and 575, the compare logic 435-1 compares the error voltage value 229 produced by the error voltage generator circuit 228 to the error voltage threshold value 426-2. If the error voltage value 229 is less than error voltage threshold value 426-2, then no overriding action is taken by phase control logic 240.

In response to detecting that the error voltage value 229 is above the error voltage threshold value 426-2 (e.g., error voltage limit) in step 570 and that fewer than the maximum number of phases of the multi-phase power supply 110 are currently activated in step 575, the phase control logic 240 increases how many phases of the multi-phase power supply 110 are activated to produce the current delivered to the dynamic load 118. In one embodiment, the phase control logic activates all phases of the multi-phase power supply 110 when detecting that the error voltage value 229 is greater than the error voltage threshold value 426-2.

As previously discussed with respect to FIG. 1, recall that the multi-phase power supply 110 can include phase control settings information 121. In one embodiment, adjusting how many phases of the power supply are activated includes modifying loop control feedback coefficients and current limit coefficients associated with each of the phases of the power supply that remain activated after the adjusting.

As an example, assume that the controller 230 operates phase 1 and phase 2 to provide current to the dynamic load 118. In such an instance, the controller 230 can configure operation of phase 1 with first control loop settings (e.g., loop control feedback settings, current limit coefficients, etc.). When reducing a number of phases to just a single operational phase such as phase 1, the controller can operate phase 1 with second control loop settings. Thus, phase 1 (as well as the other phases) can be controlled differently depending on how many other phases are active at the same time.

In further embodiments, the activation and deactivation of different numbers of phases can be done in a specific order. For example, when activating additional phases in the multi-phase power supply 110 to deliver the current to the dynamic load 110, the controller 230 initiates sequential activation of multiple phases according to a predetermined activation order. When deactivating currently activated phases in the multi-phase power supply 110, the controller 230 initiates sequential deactivation of multiple phases of the power supply 110 in accordance with a predetermined deactivation order.

In one embodiment, the predetermined deactivation order is opposite to an order sequential ordering than the predetermined activation order. For example, the multi-phase power supply 110 can include control of phase #1, phase #2, phase #3, and phase #4. For adding phases, the activation order can include activating phase #1 first, phase #2 second, phase #3, and phase #4 fourth. For removing phases, the deactivation order can be opposite to the activation order. For example, assuming that all four phases are activated, the deactivation order includes deactivating phase #4 first, phase #3 second, phase #2 third, and phase #1 last.

Figure 6:
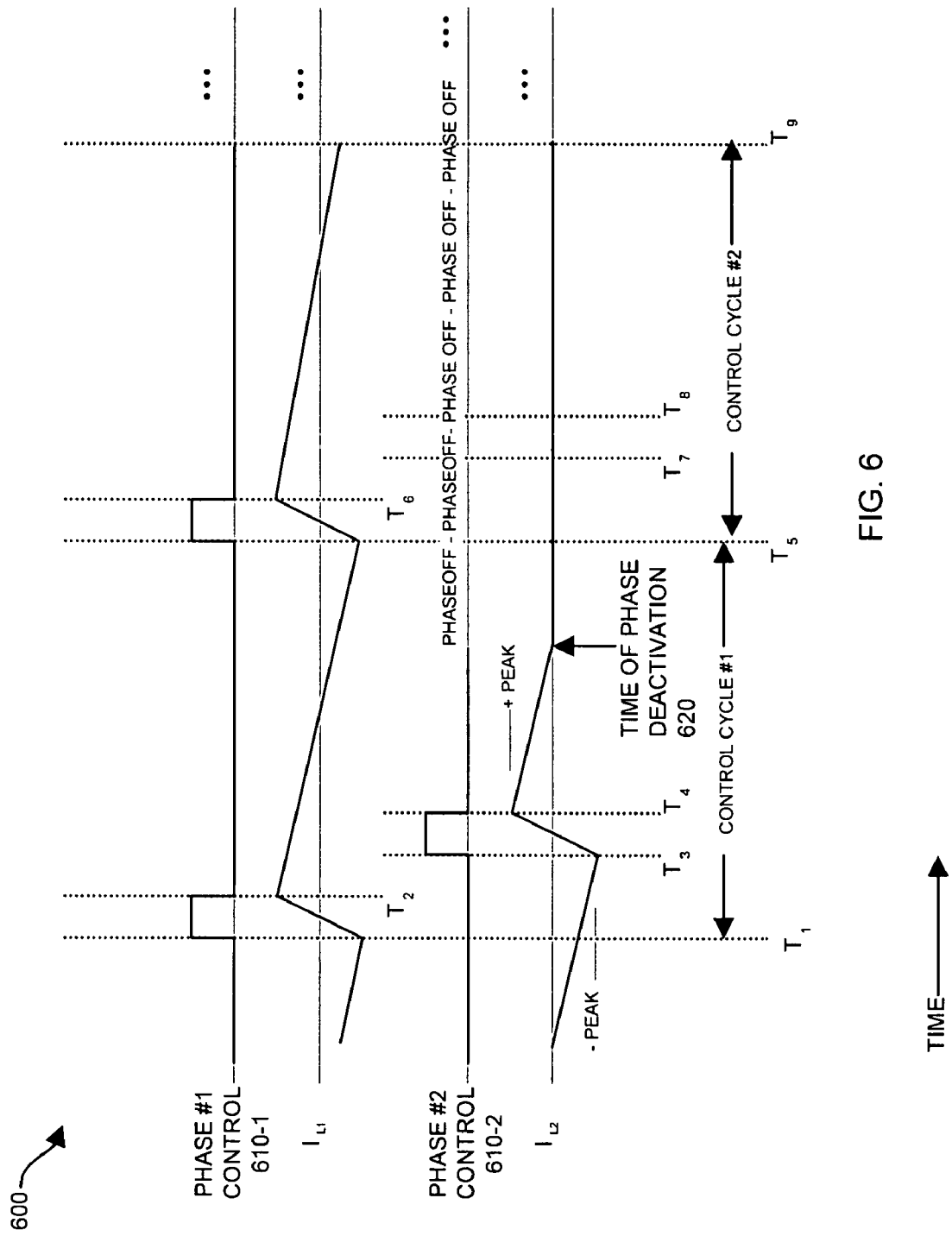
FIG. 6 is an example timing diagram illustrating phase shedding according to embodiments herein.

FIG. 6 is an example timing diagram illustrating phase shedding or deactivation of a respective phase according to embodiments herein. As shown, phase control logic 240 generates phase #1 control signal 610-1 and phase #2 control signal 610-2 for operating respective phase #1 and phase #2 in multi-phase power supply 110. An example diagram of each respective phase is shown in FIG. 2.

Further details disclosing timing details associated with the phase control signals is discussed in the related applications that have been incorporated by reference as mentioned above.

When a phase control signal (e.g., phase control 610-1 or phase control 610-2) is a logic high, the high side switch circuitry of a respective phase (such as phase #1 or phase #2) is turned ON and low side switch circuitry is turned OFF. During such time when the high side switch circuitry is ON, the current in the corresponding inductor increases as shown in FIG. 6. For example, between time between T1 and T2, the high side switch of phase #1 is ON while the low side switch of phase #1 is OFF, between time between T3 and T4, the high side switch of phase #2 is ON while the low side switch of phase #2 is OFF, etc.

When a phase control signal is a logic low, the low side switch circuitry of a respective phase is turned ON and high side switch circuitry is turned OFF. During such time when the low side switch circuitry is ON, the current in the corresponding inductor decreases as shown in FIG. 6. For example, between time between T2 and T5, the low side switch of phase #1 is ON while the high side switch of phase #1 is OFF, between time between T3 and T4, the low side switch of phase #2 is ON while the high side switch of phase #2 is OFF, etc.

Thus, as shown, between time T1 and T2, the controller 230 turns on high side switch circuitry of phase #1. Between time T2 and T5, the controller 230 turns on low side switch circuitry of phase #1. Prior to shedding phase #2, the controller 230 operates phase #2 in a similar manner. In other words, the controller 230 pulses the active phases of the power supply to produce the current for driving the dynamic load 118.

In one embodiment, during non-transient conditions, the controller 230 turns on high side switch circuitry in the respective phases at different times (so that activated phases operate out of phase with respect to each other) in the control cycles to reduce an amount of ripple present in the output voltage 180.

In this example, assume that phase #1 and phase #2 are activated and that phase #3 and phase #4 are deactivated at time T1. Assume further that the controller 230 detects a condition in which the dynamic load 118 consumes less current around time T1 and thus can operate in range 1 rather than operate in range 2. The manner of detecting this condition is discussed above.

To increase efficiency of the multi-phase power supply 110 at the example low current consumption condition, the controller 230 initiates phase shedding such as deactivation of phase #2 while continuing operation of phase #1. In accordance the present example, the controller 230 selects one or more phases to be deactivated. In this example, the controller selects phase #2 for deactivation.

As shown, to deactivate phase #2, the controller 230 turns OFF both high side switch circuitry and low side switch circuitry associated with phase #2 at deactivation time 620. For example, the controller 230 initiates deactivation of the selected phase (phase #2) at a time 610 when a corresponding current contribution supplied by the selected phase (e.g., the current through the respective inductor of phase #2) to the dynamic load 118 is around zero amperes. Thus, according to embodiments herein, the controller 230 disables (i.e., turns OFF) both a high side switch and a low side switch of the selected phase when current through a respective inductor of the selected phase is around zero amperes.

As previously discussed, all or part of controller 230 can be implemented in one or more semiconductor chips or other discrete electrical components. In one embodiment, the controller 230 is configured to turn OFF the current for a phase in approximately the middle of the low-side on-time period of a respective phase. Turning OFF in approximately a middle of the low side ON time (such as between time T4 and T5 as shown) can suppress creation of a negative current during a turn OFF, and thus prevents a large voltage overshoot condition. The voltage overshoot condition can come from the negative current forcing the switch node up to twelve volts (from the hi side power supply) so the inductor current can discharge through the body diode of the upper FET. The current is not necessarily zero when the phase is shut OFF, shutting OFF the phase in the middle just helps to guarantee that the current through the phase being shut OFF is not negative.

Thus, deactivating each of one or more respective phases in this manner (such as approximately halfway between time T4 and time T7 can reduce a magnitude of voltage perturbation that may otherwise occur in the output voltage 180. In other words, in certain cases, such as disabling respective high side switch circuitry and low side switch circuitry around time T4 or T7 when the current though the inductor is non-zero can result in an undesirable perturbation in the output voltage 180.

The exact time 610 for deactivating a phase can be based on an estimate such as an expected time when the current through the inductor of the phase is approximately zero or not negative. In certain embodiments as mentioned above, the controller 230 initiates deactivation of the selected phase at a time around a middle of a phase #2 control cycle of switching a respective low side switch circuitry to an ON state.

As an alternative, the phase can include a monitor circuit that monitors the current through the phase and produces a trigger signal indicating when the current is approximately zero. The controller 230 can use the trigger signal (or derivative signal) to turn OFF the phase.

In further embodiments, the controller 230 can be configured to deactivate multiple phases at the same time. For example, as discussed above, the controller 230 can be configured to pulse multiple phases of the multi-phase power supply 110 to deliver the current to the dynamic load 118. Adjusting how many phases of the power supply are activated to produce the current delivered to the dynamic load 118 can include selecting a grouping of phases from the multiple phases and, thereafter, initiating deactivation of the grouping of phases at a time when a corresponding net current contribution supplied by the grouping of phases to the dynamic load is around zero amperes. Since the net current between two phases is around zero amperes, there is generally little or no perturbation to the output voltage 180.

Shutting of a respective phase when the phase current is around zero reduces inductor current and ensures that there is no negative current that cause a large positive voltage spike when the inductor current conducts through the high-side switch circuitry body diode.

Figure 7:
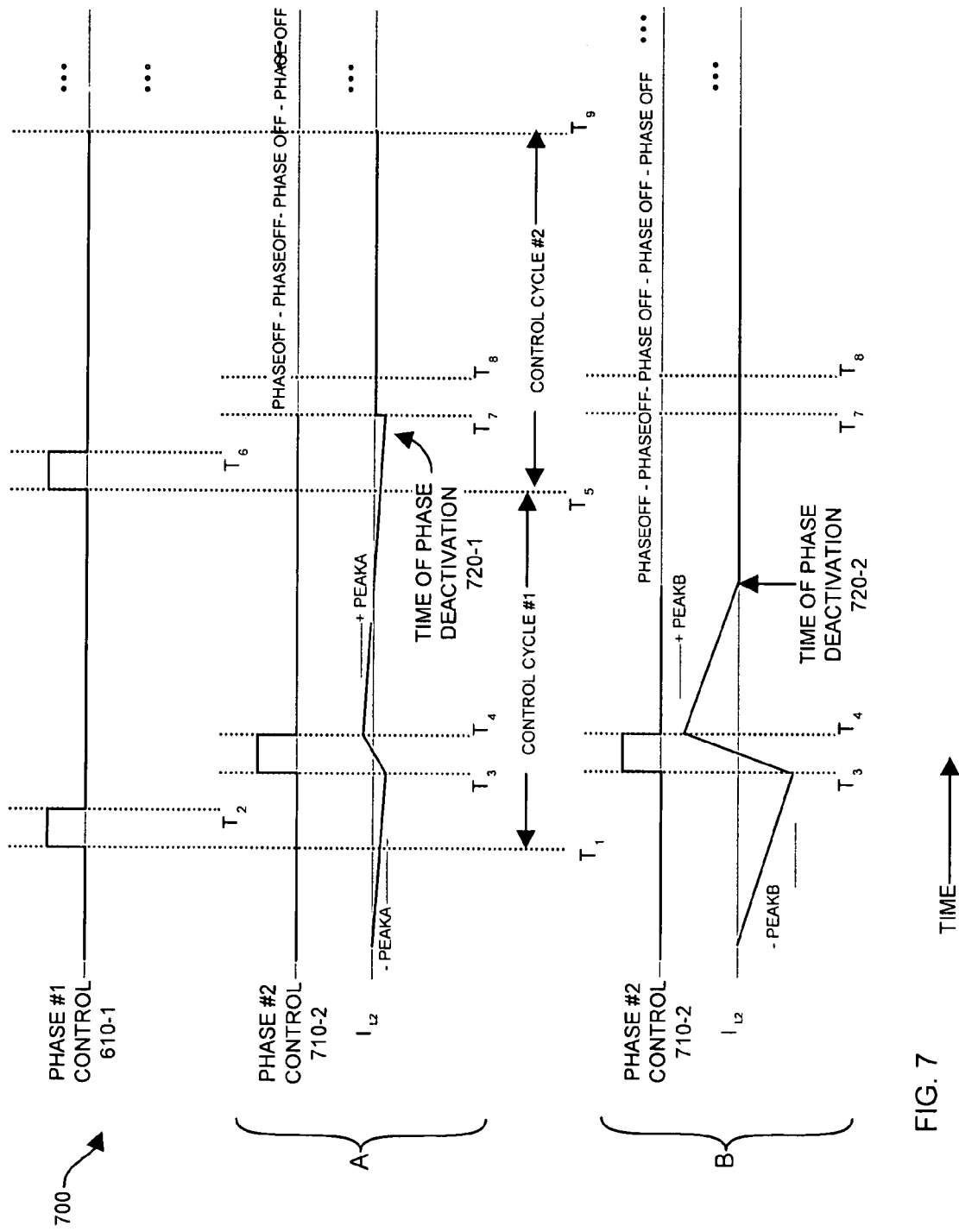
FIG. 7 is an example diagram illustrating phase shedding according to embodiments herein.

FIG. 7 is an example timing diagram 700 illustrating phase shedding or deactivation of a respective phase according to embodiments herein. Phase control logic 240 generates phase #1 control signal 610-1 for operating respective phase #1 and control signal 710 for operating phase #2 in multi-phase power supply 110. As discussed below, the controller 230 generates the control signal 710-1 for condition A and control signal 710-2 for condition B.

In this example, the controller 230 deactivates a respective phase at a different time during a control cycle depending on such as an amount of current produced by the phase being deactivated. Condition A and condition B represent the different operating conditions.

More specifically, for condition A as shown, when the current supplied by phase #2 is relatively low such as below a threshold value, the controller 230 initiates deactivation of phase #2 around time T7 (e.g., at deactivation time 720-1).

For condition B, when the current supplied by phase #2 is relatively high such as above a threshold value, the controller initiates deactivation of phase #2 approximately midway between time T4 and around time T7 (e.g., at deactivation time 720-2) in a similar manner as discussed above.

In one embodiment, the controller 230 maintains a phase current threshold value for determining when to deactivate a respective phase. For example, when deactivating one or more such as phase #2 in this example, the controller 230 compares the amount of current produced by the selected phase to the phase current threshold value. The controller 230 then initiates deactivation of the selected phase (e.g., phase #2 in this example) at a different time in the corresponding control cycle depending on whether the amount of current produced by the selected phase is above the phase current threshold value.

More specifically, in response to detecting that the amount of current produced by phase #2 is below the phase current threshold value, the controller 230 initiates deactivation of phase #2 by ensuring that both the high side switch circuitry and the low side switch circuitry are turned OFF towards an end of the phase #2 ON/OFF control cycle (e.g., around time T7). In response to detecting that the amount of current produced by phase #2 is above the phase current threshold value, the controller deactivates a phase at a time such as around a middle of time duration between time T4 and time T7.

Figure 8:
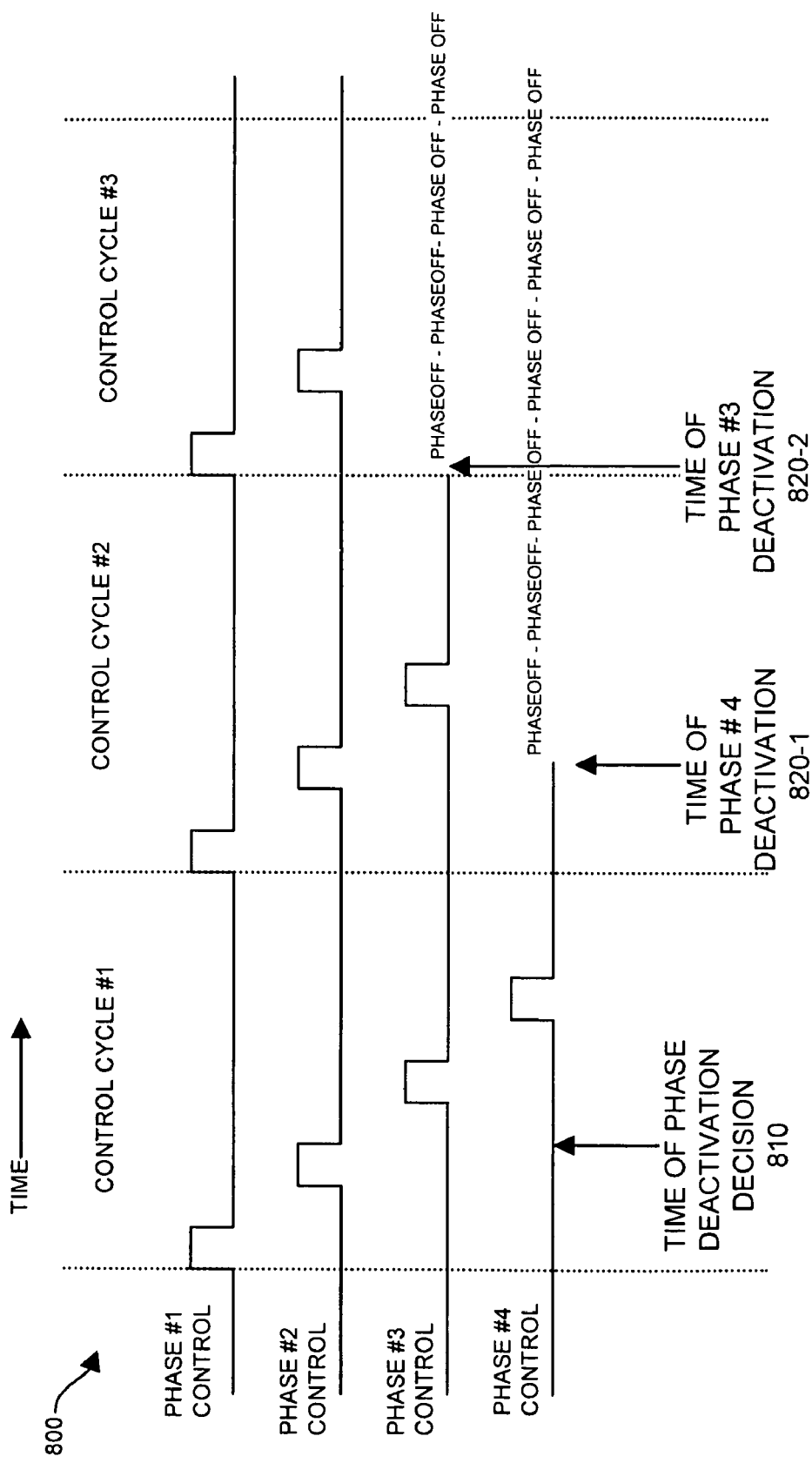
FIG. 8 is an example diagram illustrating phase shedding according to embodiments herein.

FIG. 8 is an example timing diagram illustrating deactivation of multiple phases in a sequential manner according to embodiments herein. For example, the controller 230 controls multiple phases (such as phases 1 through 4) of the multi-phase power supply 110 to deliver the current to the dynamic load 118 by activating respective high side switch circuitry of the multiple phases at different times in each of the control cycles. Assume that the controller 230 generates a decision to deactivate multiple phases such as phase #3 and phase #4 at time 810 based on the above activation/deactivation algorithm. As previously discussed, deactivation can be performed in an opposite manner to activation. Based on such a sequence, the controller deactivates phase #4 first followed by phase #3. More specifically, the controller 230 initiates deactivation of phase #4 in control cycle #2. The controller 230 initiates deactivation of phase #3 control cycle #3.

As previously discussed, the controller 230 can turn off the respective phases when the current through the respective phases is approximately zero amperes. In this example, the controller deactivates phase #4 at time 820-1 and deactivates phase #3 at time 820-2. Delaying the turn OFF of phases #3 and #4 can help reduce occurrences of perturbations on the output voltage 180.

In an opposite manner as discussed above for shedding phases, note that the controller 230 can activate each of multiple phases in successive control cycles when adding phases. For example, the controller can be configured to add phase #3 in a first control cycle and add phase #4 in a subsequent control cycle.

Figure 9A:
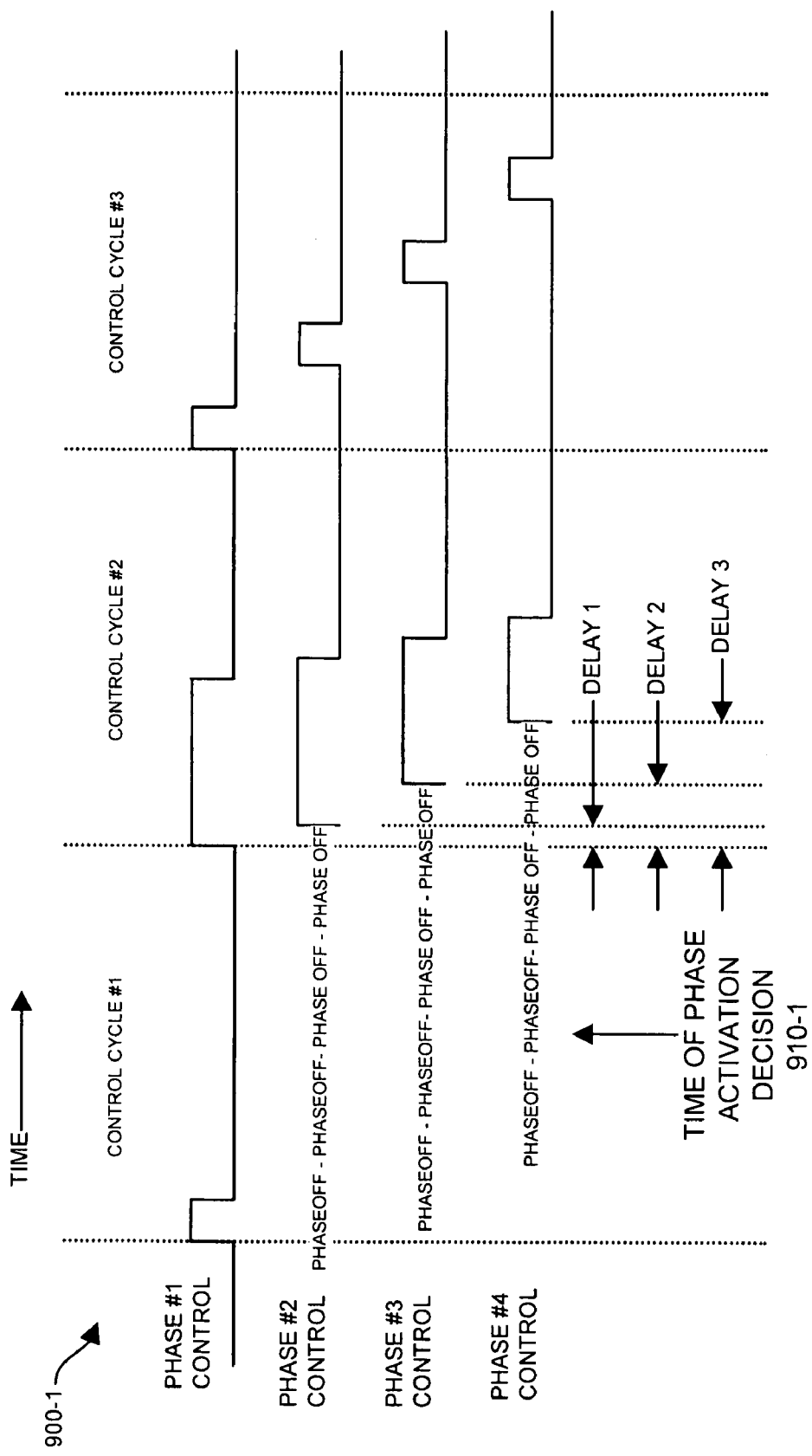

FIG. 9A is an example timing diagram 900-1 illustrating activation of multiple phases according to embodiments herein. As shown by control signals, the controller 230 can add multiple phases in a single control cycle. Such simultaneous activation can ensure that the output voltage 180 stays within an acceptable range even during extreme conditions in which the current consumption by the dynamic load 118 changes abruptly.

More specifically, during operation as discussed above, the controller 230 can select a grouping of additional phases for activation. In this example, assume that phase #1 is activated to provide current to the dynamic load 118. Assume that the controller 230 detects a condition in which three phases (phase 2, 3, and 4) should be immediately added to produce the output voltage 180 as a result of increasing current consumption by the dynamic load 118. Assume in this example that the current consumption by the dynamic load 118 slowly increases over time and that additional phases are added to account for the increase in current consumption. In other words, the example in FIG. 9A represents a case in which the current was slowly raised triggering the phases to turn on because the filtered current such as the average current consumed by the dynamic load exceeds the programmed threshold.

In FIG. 9A, when first activating the grouping of additional phases (phase 2, 3, and 4) in a given control cycle of multiple control cycles, the controller 230 initiates activation of the grouping of additional phases by simultaneously activating respective high side switch circuitry of each phase in the grouping such that the high side switches of activated phases are simultaneously ON state for at least a portion of time as shown in timing diagram 900-1. As mentioned above, simultaneous activation of the additional phases provides a fast response to prevent over voltage and under voltage conditions on the output voltage 180.

Activating the high side switch circuitry of each newly added phase can be performed gradually. For example, the controller initially operates a single phase such as phase #1 to drive dynamic load 118. As previously discussed, this can include pulsing high side switch circuitry of phase 1 during control cycle #1 and previous cycles. The addition of phases can include providing increasingly larger delay times for each new added phase.

In the present example, the controller 230 activates phase #2 (by first turning ON high side switch circuitry associated with phase #2) after waiting a time duration of delay #1 from a respective time of turning on the phase #1 high side switch in control cycle #2. The controller 230 activates phase #3 (by first turning ON high side switch circuitry associated with phase #3) after waiting a time duration of delay #2 from a respective time of turning on the phase #1 high side switch in control cycle #2. The controller 230 activates phase #3 (by first turning ON high side switch circuitry associated with phase #3) after waiting a time duration of delay #3 from a respective time of turning on the phase #1 high side switch in control cycle #2.

Thus, embodiments herein include delaying a time of turning ON high side switch circuitry of phase #2 by a first amount relative to the phase #1 control signal; delaying a time of turning ON high side switch circuitry of phase #3 by a second amount relative to the phase #1 control signal, and delaying a time of turning ON high side switch circuitry of phase #4 by a third amount relative to the phase #1 control signal.

Note that there are circumstances in which the current required by the dynamic load 118 can increase more rapidly than as mentioned in the above example. In another example in which the dynamic load 118 changes more quickly and requires additional current, the technique of waiting (as in FIG. 9A) for the control cycle #1 to complete before activating the additional phases may not be desirable. In the case of a larger, faster load step with respect to the dynamic load, the phases can be turned ON with little or no delay relative to the time of phase activation decision 910-2 as shown in FIG. 9B.

Figure 9B:
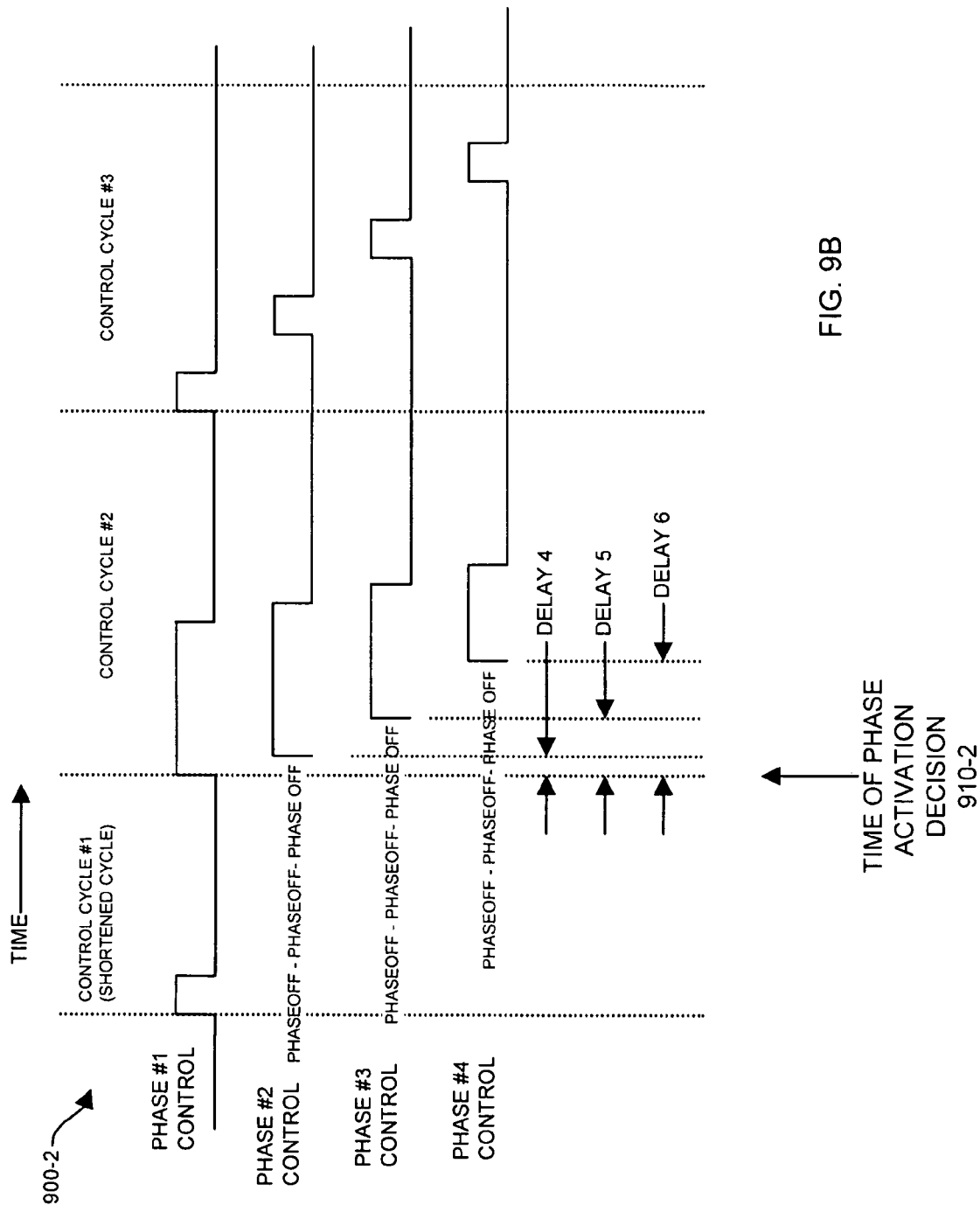

More specifically, as shown in FIG. 9B, rather than delaying turning ON of additional phases relative to the activation decision 910-2, the controller 230 truncates cycle #1 to turn on the additional phases sooner than as in FIG. 9A. For example, in FIG. 9B the extra phases are turned on sooner in time to account for the change in the dynamic load. The result of truncating cycle 1 is that the extra phases that are turned ON to account for the sudden increase in required current are pulled in closer to a time of the phase activation decision 910-2 as opposed to waiting for the control cycle #1 to be completed before activating the phases. As shown, the controller 230 can still implement delays between activating each additional phase.

As shown in FIG. 9C, if required or further desirable, in addition to pulling the phases in to start around the time of the phase activation decision 910-3, the leading edges of activating the phase control signals can be aligned (i.e., phase delays for each of the multiple phases each can be reduced to zero) to provide a fast response to provide the appropriate current to power the load. Trailing edges of turning off the respective high side switches of the activated phases can be aligned or delayed with respect to each other.

Figure 10:
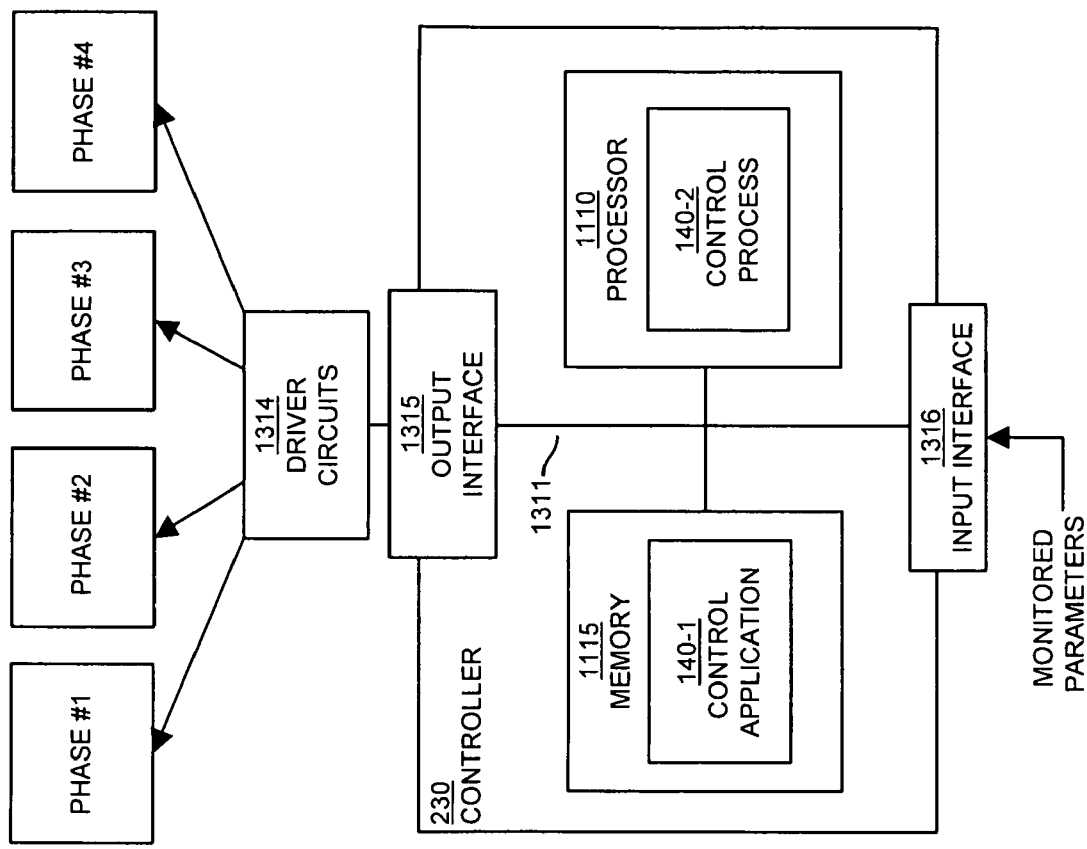
FIG. 10 is an example diagram illustrating an architecture for controlling a multi-phase power supply according to embodiments herein.

FIG. 10 is a block diagram of an example architecture of a respective controller 230 for implementing the control algorithm as described herein. Controller 1010 can be or include a DSP (Digital Signal Processor), FPGA (Field Programmable Gate Array), micro-controller, etc. to carry out the techniques as discussed above and further below.

As shown, controller 230 of the present example includes an interconnect 1311 that couples a memory system 1115, a processor 1010, output interface 1315, and an input interface 1316.

The controller 230 produces phase control signals via output interface 1315 to drive driver circuits 1314. Based on the output from output interface 1315, the driver circuits 1314, in turn, control respective phases 1 through 4 in a manner as described herein.

Memory system 1115 can be encoded with a control application 140-1 that enables processor 1010 to support generation of appropriate control signal(s) to control phases and regulate output voltage 180 as discussed above and as discussed further below. Accordingly, control application 140-1 can be embodied as software code such as data and/or logic instructions (e.g., code stored in the memory or on another computer readable medium such as a disk) that supports processing functionality according to different embodiments described herein.

During operation according to one embodiment, processor 1010 accesses memory system 1115 via the use of interconnect 1311 in order to launch, run, execute, interpret or otherwise perform the logic instructions of the control application 140-1. Execution of the control application 140-1 produces processing functionality in control process 140-2. In other words, the control process 140-2 represents one or more portions of the control application 140-1 performing within or upon the processor device 1010.

It should be noted that, in addition to the control process 140-2 that carries out example method operations as discussed herein, other embodiments herein include the control application 140-1 itself such as the un-executed or non-performing logic instructions and/or data for producing control signal(s) to control each of multiple voltage converter phases. The control application 140-1 (e.g., phase control algorithm as described herein) may be stored on a computer readable medium (e.g., a repository) such as a floppy disk, hard disk or in an optical medium. According to other embodiments, the control application 140-1 can also be stored in a memory type system such as in firmware, read only memory (ROM), or, as in this example, as executable code within the memory system 1115 (e.g., within Random Access Memory or RAM).

As mentioned above, note again that all or part of the controller 230 and related circuit can be configured as a state machine. The state machine can include storage such as a non-volatile memory (e.g., flash ROM) to store configuration parameters. No processor or micro-controller is needed in such an embodiment. Thus, in one or more embodiments, the controller 230 need not be a programmable computing device that executes instructions to carry out the operations as described herein. Instead, the controller 230 can be implemented as a collection of logic gates, registers, and other electronic circuitry known to one of ordinary skill in the art. The registers can be loaded with configuration parameters (numbers) such as thresholds, filter selection, etc., to carry out the operations as described herein.

Functionality supported by controller 230 and related circuits in multi-phase power supply 110 will now be discussed via flowcharts in respective FIGS. 11, 12, 13, and 14. For purposes of the following discussion, the controller 230, control application 140-1, and/or corresponding circuits generally performs steps in the flowchart. Note that there will be some overlap with respect to concepts discussed above. Also, note that the steps in the below flowcharts need not always be executed in the order shown.

Figure 11:
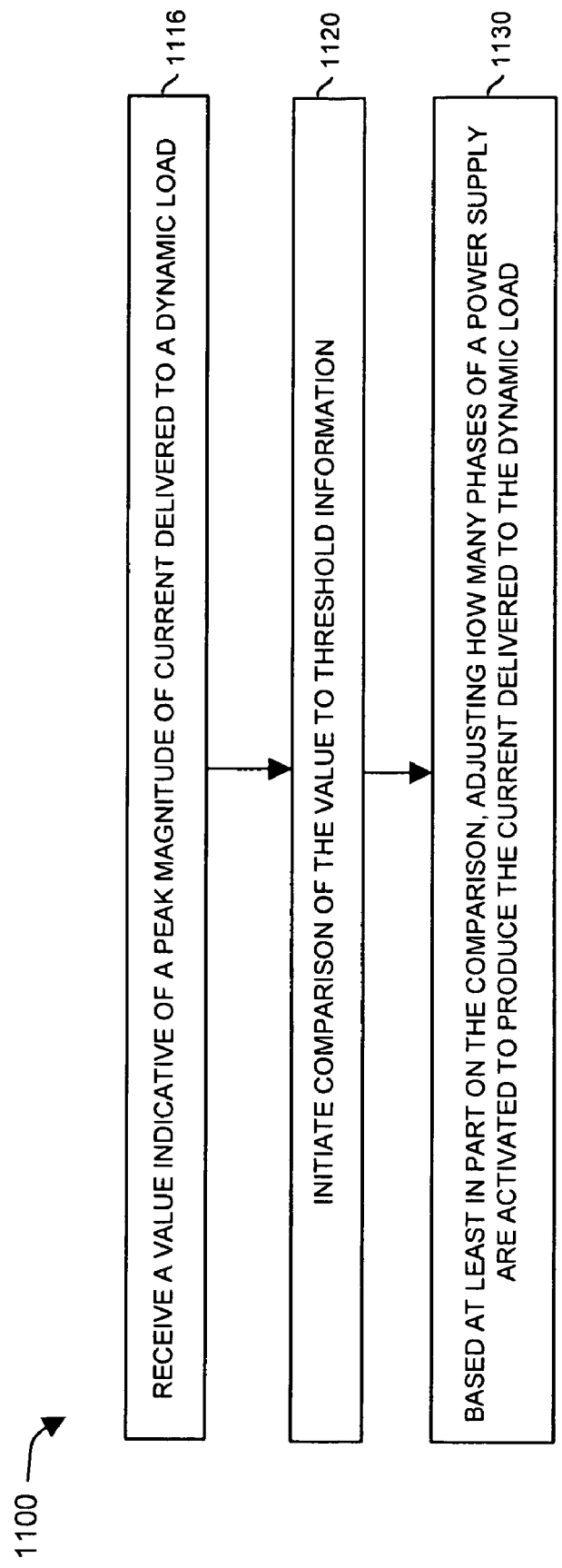
FIGS. 11-14 are example flowcharts illustrating example methods and instructions according to embodiments herein.

More specifically, FIG. 11 is a flowchart 1100 illustrating a technique of controlling phases of a multi-phase power supply 110 according to embodiments herein.

In step 1110, the controller 230 receives a value indicative of a peak magnitude of current delivered to a dynamic load 118.

In step 1120, the controller 230 initiates comparison of the value to threshold information 126.

In step 1130, based at least in part on the comparison, the controller 230 adjusts how many phases of the multi-phase power supply 110 are activated to produce the current delivered to the dynamic load 118.

Figure 12:
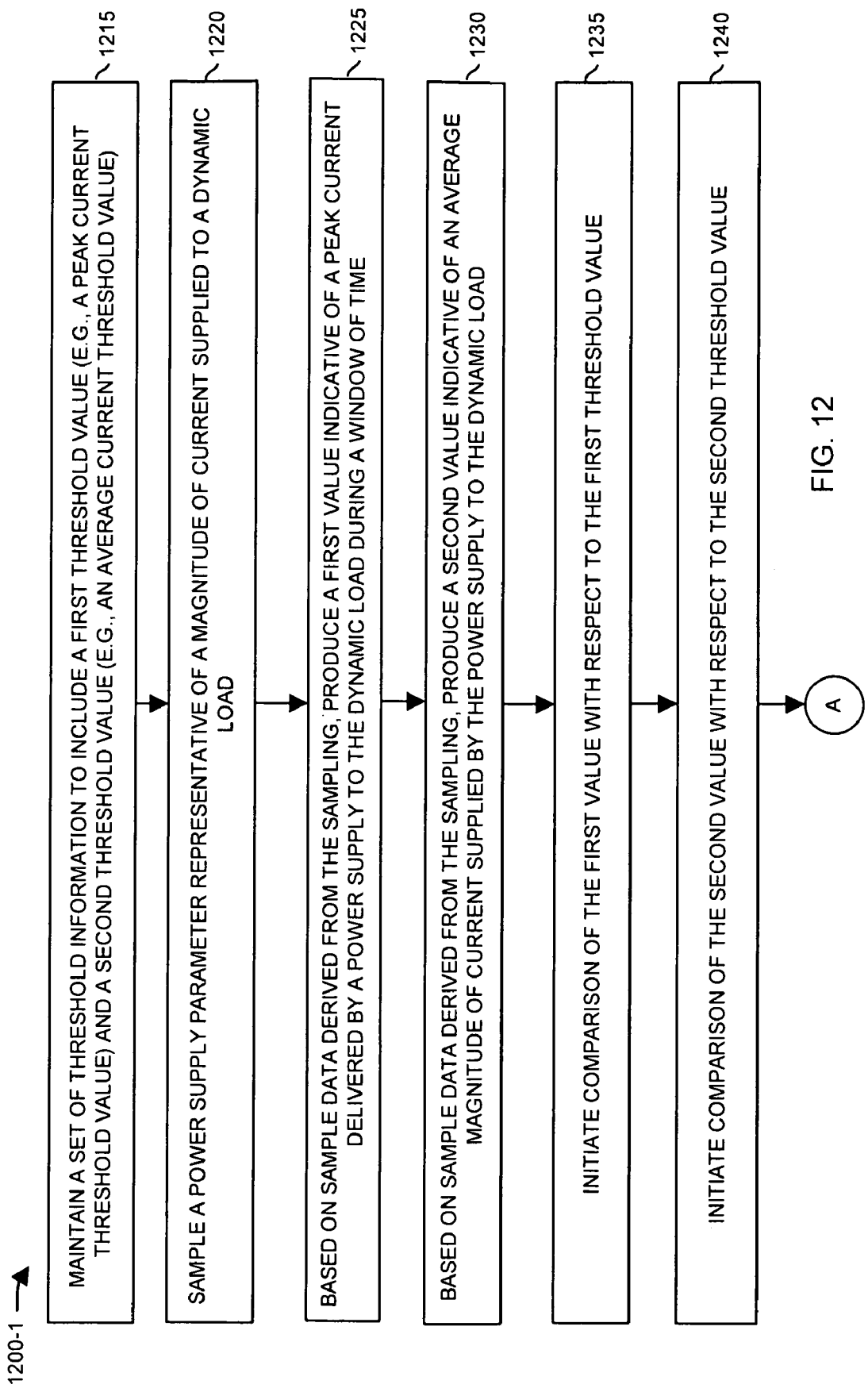
Figure 13:
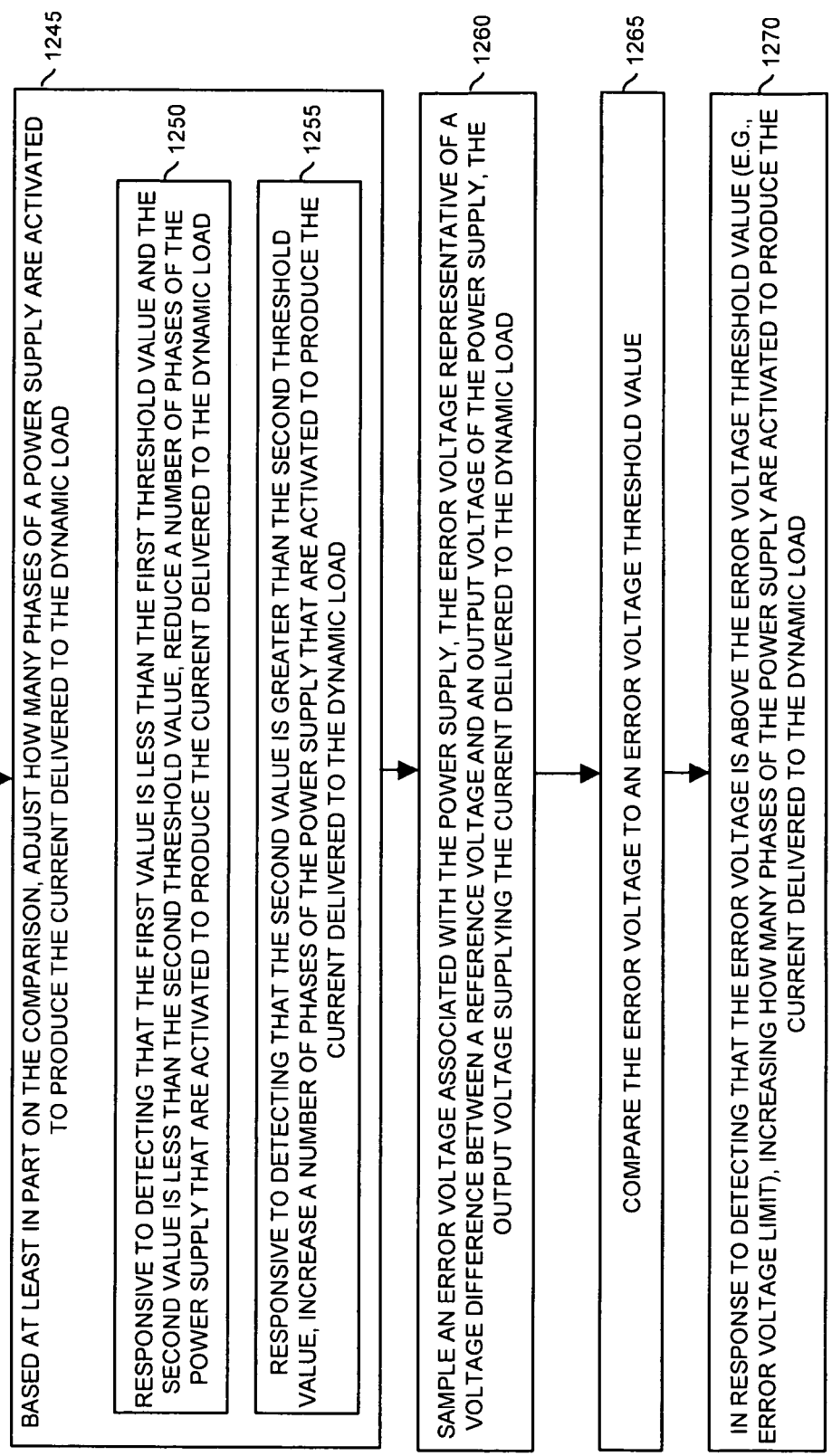

FIGS. 12 and 13 combine to form a flowchart 1200 illustrating a technique of controlling phases of a multi-phase power supply 110 according to embodiments herein.

In step 1215, the controller 230 maintains a set of threshold information 126 to include a first threshold value (e.g., a peak current threshold value) and a second threshold value (e.g., an filtered current threshold value).

In step 1220, the controller 230 samples a power supply parameter representative of a magnitude of current supplied to a dynamic load 118.

In step 1225, based on sample data derived from the sampling, the controller 230 produces a first value indicative of a peak current delivered by a power supply to the dynamic load 118 during a window of time.

In step 1230, based on sample data derived from the sampling, the controller 230 produces a second value indicative of an average magnitude of current supplied by the multi-phase power supply 110 to the dynamic load 118.

In step 1235, the controller 230 initiates comparison of the first value with respect to the first threshold value.

In step 1240, the controller 230 initiates comparison of the second value with respect to the second threshold value.

In step 1245 of FIG. 13, based at least in part on the comparison, the controller 230 adjusts how many phases of the multi-phase power supply 110 are activated to produce the current delivered to the dynamic load 118.

In step 1250, responsive to detecting that the first value is less than the first threshold value and the second value is less than the second threshold value, the controller 230 reduces a number of phases of the power supply that are activated to produce the current delivered to the dynamic load 118.

In step 1255, responsive to detecting that the second value is greater than the second threshold value, the controller 230 increases a number of phases of the power supply that are activated to produce the current delivered to the dynamic load 118.

In step 1260, the controller 230 samples an error voltage associated with the multi-phase power supply 110. As previously discussed, the error voltage is representative of a voltage difference between a reference voltage and an output voltage 180 of the multi-phase power supply 110.

In step 1265, the controller 230 compares the error voltage to an error voltage threshold value.

In step 1270, in response to detecting that the error voltage is above the error voltage threshold value (e.g., error voltage limit), the controller 230 increases how many phases of the multi-phase power supply 110 are activated to produce the current delivered to the dynamic load 118.

Figure 14:
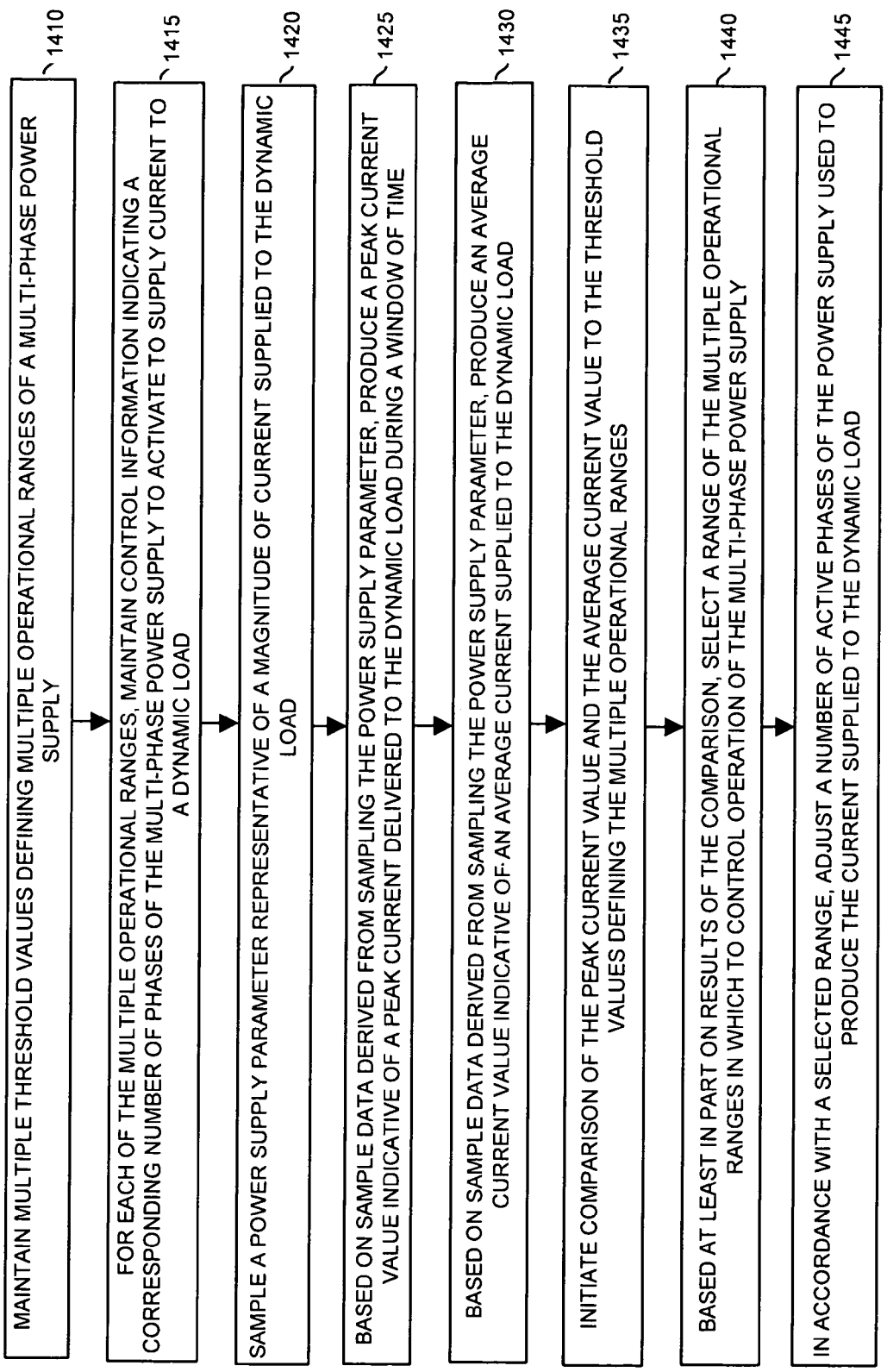

FIG. 14 is a flowchart 1400 illustrating a technique of controlling phases of a multi-phase power supply 110 according to embodiments herein.

In step 1410, the controller 230 maintains multiple threshold values defining multiple operational ranges of a multi-phase power supply 110.

In step 1415, for each of the multiple operational ranges, the controller 230 maintains control information indicating a corresponding number of phases of the multi-phase power supply 110 to activate to supply current to a dynamic load 118.

In step 1420, the controller 230 samples a power supply parameter representative of a magnitude of current supplied to the dynamic load 118.

In step 1425, based on sample data derived from sampling the power supply parameter, the controller 230 produces a peak current value indicative of a peak current delivered to the dynamic load 118 during a window of time.

In step 1430, based on sample data derived from sampling the power supply parameter, the controller 230 produces an filtered current value indicative of an average current supplied to the dynamic load 118.

In step 1435, the controller 230 initiates comparison of the peak current value and the average current value to the threshold values defining the multiple operational ranges.

In step 1440, based at least in part on results of the comparison, the controller 230 selects a range of the multiple operational ranges in which to control operation of the multi-phase power supply 110.

In step 1445, in accordance with a selected range, the controller 230 adjusts a number of active phases of the power supply used to produce the current supplied to the dynamic load 118.

Note that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
    maintaining threshold information to include a first threshold value and a second threshold value, the first threshold value representing a peak current threshold value, the second threshold value representing a filtered current threshold value;
    receiving a first value indicative of a peak magnitude of current delivered to a dynamic load during a window of time, the first value being a peak current value derived from multiple samples of the current taken during the window of time;
    initiating comparison of the first value to the first threshold value of the threshold information; and
    receiving a second value indicative of a magnitude of current delivered to the dynamic load;
    initiating comparison of the second value to the second threshold value of the threshold information; and
    based at least in part on the comparison, adjusting how many phases of a power supply are activated to produce the current delivered to the dynamic load;
    responsive to detecting that the first value is less than the first threshold value and the second value is less than the second threshold value, reducing a number of phases of the power supply that are activated to produce the current delivered to the dynamic load.

2. The method as in claim 1 further comprising:
    sampling an error voltage associated with the power supply, the error voltage representative of a voltage difference between a reference voltage and an output voltage of the power supply, the output voltage supplying the current delivered to the dynamic load;
    comparing the error voltage to an error voltage threshold value; and
    in response to detecting that the error voltage is above the error voltage threshold value, increasing how many phases of the power supply are activated to produce the current delivered to the dynamic load.

3. The method as in claim 2, wherein increasing how many phases of the power supply are activated to produce the current delivered to the dynamic load further comprises:
    activating all of the phases of the power supply to produce the current delivered to the dynamic load.

4. The method as in claim 1 further comprising:
    enabling programming of a bandwidth associated with a low-pass filter to enable control of the power supply via custom settings; and
    generating the second value based on repeated sampling of the current delivered to the dynamic load via the low pass filter such that the second value represents the magnitude of current delivered to the dynamic load.

5. The method as in claim 1, wherein adjusting how many phases of the power supply are activated includes modifying loop control feedback coefficients and current limit coefficients associated with each of the phases of the power supply that remain activated after the adjusting.

6. The method as in claim 1, wherein adjusting how many phases of the power supply are activated to produce the current delivered to the dynamic load further comprises:
    if activating additional phases in the power supply to deliver the current to the dynamic load, initiating sequential activation of multiple phases according to a predetermined activation order; and
    if deactivating activated phases in the power supply, initiating sequential deactivation of multiple phases of the power supply in accordance with a predetermined deactivation order, the predetermined activation order being an opposite sequential ordering than the predetermined deactivation order.

7. The method as in claim 1, wherein adjusting how many phases of the power supply are activated to produce the current delivered to the dynamic load further comprises:
    initiating deactivation of phases in the power supply in response to detecting that i) the magnitude of the peak current delivered to the dynamic load in a respective time window is less than a peak current threshold value, and ii) a filtered current value delivered to the dynamic load is less than a filtered current threshold value.

8. The method as in claim 1, wherein adjusting how many phases of the power supply are activated to produce the current delivered to the dynamic load further comprises:

initiating activation of additional phases in the power supply in response to detecting that an average current delivered to the dynamic load is greater than a threshold value.

9. The method as in claim 1, wherein adjusting how many phases of the power supply are activated to produce the current delivered to the dynamic load further comprises:
initiating activation of additional phases in the power supply in response to detecting that an error voltage associated with an output of the power supply is greater than an error voltage limit.

10. The method as in claim 1 further comprising:
pulsing multiple phases of the power supply to deliver the current to the dynamic load; and
wherein adjusting how many phases of the power supply are activated to produce the current delivered to the dynamic load further comprises:
selecting a phase of the multiple phases; and
initiating deactivation of the selected phase at a time when a corresponding current contribution supplied by the selected phase to the dynamic load is around zero amperes.

11. The method as in claim 10, wherein initiating deactivation of the selected phase includes disabling both a high side switch and a low side switch of the selected phase when current through a respective inductor of the selected phase is around zero amperes.

12. The method as in claim 1 further comprising:
pulsing multiple phases of the power supply to deliver the current to the dynamic load, the pulsing including cyclically switching respective high side switch circuitry and low side switch circuitry of each phase ON and OFF; and
wherein adjusting how many phases of the power supply are activated to produce the current delivered to the dynamic load further comprises:
selecting a phase of the multiple phases; and
initiating deactivation of the selected phase at a time around a middle of a control cycle of switching respective low side switch circuitry to an ON state.

13. The method as in claim 12, wherein initiating deactivation of the selected phase includes switching both high side switch circuitry and low side switch of the selected phase to an OFF state.

14. The method as in claim 1 further comprising:
pulsing multiple phases of the power supply to deliver the current to the dynamic load; and
wherein adjusting how many phases of the power supply are activated to produce the current delivered to the dynamic load further comprises:
selecting a grouping of phases from the multiple phases; and
initiating deactivation of the grouping of phases at a time when a corresponding net current contribution supplied by the grouping of phases to the dynamic load is around zero amperes.

15. The method as in claim 1 further comprising:
controlling multiple phases of the power supply to deliver the current to the dynamic load;
selecting a phase of the multiple phases; and
initiating deactivation of the selected phase at a respective time in a corresponding control cycle depending on an amount of current produced by the selected phase for powering the dynamic load.

16. The method as in claim 15 further comprising:
maintaining a phase current threshold value;
comparing the amount of current produced by the selected phase to the phase current threshold value; and
initiating deactivation of the selected phase at a different time in the corresponding control cycle depending on whether the amount of current produced by the selected phase is above the phase current threshold value.

17. The method as in claim 16, wherein the control cycle includes a time duration in which low side switch circuitry of the selected phase is ON and high side switch circuitry of the selected phase is OFF; and
wherein initiating deactivation of the selected phase at a different time in the corresponding control cycle includes:
responsive to detecting that the amount of current produced by the selected phase is below the phase current threshold value, deactivating the selected phase by switching the low side switch circuitry OFF towards an end of the time duration; and
responsive to detecting that the amount of current produced by the selected phase is above the phase current threshold value, deactivating the selected phase by switching the low side switch circuitry OFF around a middle of the time duration.

18. The method, as in claim 1 further comprising:
controlling multiple phases of the power supply to deliver the current to the dynamic load by activating respective high side switch circuitry of the multiple phases at different times in each control cycle of multiple control cycles;
selecting a group of phases of the multiple phases for deactivation; and
initiating deactivation of a first phase in the group of phases in a first control cycle; and
initiating deactivation of a second phase in the group of phases in a second control cycle subsequent to the first control cycle.

19. The method as in claim 1, wherein adjusting how many phases of the power supply are activated to produce the current delivered to the dynamic load further comprises:
selecting a grouping of additional phases from the multiple phases for activation; and
when first activating the grouping of additional phases in a given control cycle of multiple control cycles, initiating activation of the grouping of additional phases by simultaneously activating respective high side switch circuitry of each phase in the grouping to an ON state for at least a portion of time.

20. The method as in claim 19 further comprising:
pulsing high side switch circuitry of at least one phase of the power supply used to deliver the current to the dynamic load prior to activating the grouping of additional phases, the pulsing including producing a control signal to turn the high side switch circuitry of the at least one phase to an ON state during a control cycle; and
wherein initiating activation of the grouping of additional phases further comprises:
delaying a time of turning ON high side switch circuitry of a first phase in the grouping by a first amount relative to the control signal; and
delaying a time of turning ON high side switch circuitry of a second phase in the grouping by a second amount relative to the control signal.

21. The method as in claim 1, wherein the first value is a sample from the multiple samples taken during the window of time, the method further comprising:
sampling an error voltage associated with the power supply, the error voltage representative of a voltage difference between a reference voltage and an output voltage of the power supply, the output voltage supplying the current delivered to the dynamic load;

comparing the error voltage to an error voltage threshold value; and determining how many phases of the power supply to activate to produce the current delivered to the dynamic load based on results of:
i) the comparison of the first value to the threshold information,
ii) a comparison of the second value to the second threshold value, and
iii) comparing the error voltage to the error voltage threshold value.

22. The method as in claim 1, wherein the first value is a sample from the multiple samples taken during the window of time.

23. The method as in claim 1, wherein the window of time is a moving window of time;
wherein the moving window of time is a preset duration; and
wherein the first value represents a highest detected value of the magnitude of the current that occurs during the moving window of time.

24. The method as in claim 23, wherein the window of time is a most recent window of time.

25. A method comprising:
sampling a power supply parameter representative of a magnitude of current supplied to a dynamic load;
based on multiple samples of the magnitude of current obtained from the sampling, producing a first value indicative of a peak current delivered to the dynamic load during a window of time in which the multiple samples are obtained;
based on sample data derived from the sampling, producing a second value indicative of an average current supplied to the dynamic load;
maintaining at least one threshold value defining ranges and, for each range, a corresponding number of phases of a multi-phase power supply to activate to produce the current supplied to the dynamic load;
initiating comparison of the first value and the second value to respective threshold values; and
based on results of the comparison, adjusting a number of active phases of the power supply used to produce the current supplied to the dynamic load; and responsive to detecting that the first value is less than a first threshold value and the second value is less than a second threshold value, reducing a number of phases of the power supply that are activated to produce the current delivered to the dynamic load.

26. The method as in claim 25 further comprising:
simultaneously implementing an efficiency control loop and a transient detection control loop in a power supply, the efficiency control loop including steps as recited in claim 25; and
wherein implementing the transient detection control loop includes:
sampling an error voltage associated with the power supply, the error voltage representative of a voltage difference between a reference voltage and an output voltage of the power supply, the output voltage supplying the current delivered to the dynamic load;
comparing the error voltage to an error voltage threshold value; and
in response to detecting that the error voltage is above the error voltage threshold value, increasing how many phases of the power supply are activated to produce the current delivered to the dynamic load.

27. The method as in claim 25, wherein the first value a sample from the multiple samples taken during the window of time;
wherein the window of time is a moving window of time;
wherein the moving window of time is a preset duration;
wherein the first value represents a highest detected value of the magnitude of the current that occurs during the moving window of time;
wherein the window of time is a most recent window of time of continuously sampling the magnitude of the current over time.

* * * * *